(12) United States Patent
Ichikawa

(10) Patent No.: US 6,466,285 B1
(45) Date of Patent: Oct. 15, 2002

(54) LIQUID CRYSTAL DEVICE OR APPARATUS COMPRISES PIXELS OF AT LEAST ONE OF THREE PRIMARY COLORS HAVING A PIXEL SIZE DIFFERENT FROM THOSE OF PIXELS OF THE OTHER COLORS

(75) Inventor: Takeshi Ichikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/546,377

(22) Filed: Apr. 10, 2000

(30) Foreign Application Priority Data

Apr. 13, 1999 (JP) ............................ 11-105613

(51) Int. Cl.$^7$ ...................... G02F 1/1335; G02F 1/1333
(52) U.S. Cl. ................. 349/95; 349/8; 349/84; 349/106; 349/109
(58) Field of Search ............... 349/95, 8, 84, 349/106, 109; 250/208.1

(56) References Cited

U.S. PATENT DOCUMENTS

| | | | |
|---|---|---|---|
| 5,726,719 A | 3/1998 | Tanaka et al. | 349/8 |
| 5,790,213 A | 8/1998 | Sasaki et al. | 349/48 |
| 6,078,371 A | * 6/2000 | Ichikawa et al. | |
| 6,137,100 A | * 10/2000 | Fossum et al. | |
| 6,339,459 B1 | * 1/2002 | Ichikawa et al. | |

FOREIGN PATENT DOCUMENTS

| | | |
|---|---|---|
| JP | 07-159771 | 6/1995 |
| JP | 8-114780 | 3/1998 |
| JP | 3187254 | 5/2001 |
| KR | 96-0011523 | 4/1996 |
| KR | 98-014147 | 5/1998 |

* cited by examiner

*Primary Examiner*—William L. Sikes
*Assistant Examiner*—Julie Ngo
(74) *Attorney, Agent, or Firm*—Fitzpatrick, Cella, Harper & Scinto

(57) ABSTRACT

A small-size liquid crystal capable of exhibiting good color balance and light utilization efficiency is formed of a layer of liquid crystal, two-dimensionally arranged pixel electrodes disposed so as to apply voltages to the liquid crystal and, together with the liquid crystal, form two-dimensionally arranged pixels each corresponding to one pixel electrode and designed to emit light of one of a plurality of colors, and an array of microlenses disposed to illuminate each pixel with a condensed light spot of illumination light of one of the plurality of colors. In the device, pixels of at least one of the plurality of colors are set to have a pixel size different from those of pixels of the other color(s).

6 Claims, 18 Drawing Sheets

B-B' SECTION

A-A' SECTION

ARBITRARY RGB-MIXED COLOR

| R | G | B | R | G | B | R | G | B | R | G | B |
|---|---|---|---|---|---|---|---|---|---|---|---|
| R | G | B | R | G | B | R | G | B | R | G | B |
| R | G | B | R | G | B | R | G | B | R | G | B |
| R | G | B | R | G | B | R | G | B | R | G | B |
| R | G | B | R | G | B | R | G | B | R | G | B |

FIG. 23
PRIOR ART

LIQUID CRYSTAL DEVICE OR APPARATUS COMPRISES PIXELS OF AT LEAST ONE OF THREE PRIMARY COLORS HAVING A PIXEL SIZE DIFFERENT FROM THOSE OF PIXELS OF THE OTHER COLORS

BACKGROUND OF THE INVENTION

The present invention relates to a liquid crystal device equipped with microlenses and a liquid crystal display apparatus, particularly a full-color liquid crystal display apparatus, including the liquid crystal device.

In today's multi-media world, there is an increasing demand for apparatuses and devices which communicate with picture data. Among these, a liquid crystal display apparatus has gained public attention because of its small thickness and small power consumption. A major industry comparable to the semiconductor industry has already developed in that regard. The liquid crystal display apparatus has been principally used in notebook-type personal computers having a picture area size of 10–20 inches, but it is believed to be adaptable to larger-area display apparatuses not only for personal computers, but also for workstations and home television sets.

An increase in picture size is accompanied by problems, such as the need for larger-scale and expensive production apparatuses and the requirement for extensive electrical requirements for driving such large-area apparatuses. These problems lead to a severe increase in production cost, which increases to the second to third power of the picture area increase.

Accordingly, in recent years, attention has been given to a projection-type liquid crystal display system, wherein a small-size liquid crystal display panel is prepared, and a picture displayed thereon is optically enlarged to be displayed to a viewer. This is advantageous because the production of a small-size liquid crystal panel can take advantage of advances in production technology which allow the simultaneous achievement of a smaller size, an improved performance and a cost reduction, similarly as a scaling rule regarding a higher density, a higher definition, a performance improvement and a cost reduction in production of semiconductor devices.

For the above purpose and especially in the case of a TFT-driven liquid crystal display panel, sufficiently small TFTs (thin film transistors) having a sufficient drive power are required; the current trend is a shift from amorphous Si TFTs to polycrystalline Si TFTs and further to TFTs formed on a single-crystalline Si substrate. Accordingly, there has been proposed a liquid crystal display apparatus including an integral structure of a display region and a peripheral drive circuit, wherein not only TFTs but also a peripheral drive circuit such as a shift register or a decoder are integrally formed of polycrystalline Si or single-crystalline Si.

As an example of a liquid crystal display apparatus having such a structure, a projection-type liquid crystal display apparatus is known. In a typical system including the display apparatus, polarized-light is incident to the liquid crystal device to provide emitted light which has been modulated according to given display picture data, thereby enlarging and projecting the emitted light image for viewing. In such a liquid crystal display apparatus, it is a general practice to include a microlens array so as to provide an increased aperture ratio of the liquid crystal device (i.e., areal percentage of aperture given by pixel electrodes), as disclosed in Japanese Laid-Open Patent Application JP-A 8-114780, which discloses a microlens-equipped liquid crystal panel and a liquid crystal display apparatus including the panel. The microlens-equipped liquid crystal panel for this purpose is generally of a transmission type. An example structure thereof is shown in FIG. 10, wherein a liquid crystal layer 17 is disposed between a layer of pixel electrodes 18 and an array of microlenses 16, and respective illumination lights of primary colors R, G and B are incident to the liquid crystal panel at respectively different angles so that the respective primary color lights are caused to enter respectively different pixels or pixel electrodes 18, whereby a color filter layer is removed and an improved light utilization efficiency is realized. This type of projection display apparatus can achieve a bright full-color picture projection display using a single liquid crystal panel, and a commercial product thereof is gradually being introduced on the market.

FIG. 3 shows a basic optical system for a display apparatus including such a known microlens-equipped liquid crystal panel. Referring to FIG. 3, the display apparatus system includes a light source 201, a dichroic mirror 202 of red (R), a dichroic mirror 203 of green (G) and a dichroic mirror 204 of blue (B) for selectively reflecting red, green and blue light fluxes, respectively, from the light source 201, a liquid crystal panel or device 205 for modulating the light fluxes from the dichroic mirrors, a Fresnel lens 206, a projection lens 207, and a screen 208. Parallel light emitted from the light source 201 is separated by the respective dichroic mirrors 202, 203 and 204 into respective light fluxes of R, G and B, which are then incident to the liquid crystal device 205. In the liquid crystal device 205, voltages applied to the liquid crystal at the respective pixels of R, G and B are controlled to effect luminance modulation, depending on given picture data, and the emitted picture data-carrying light fluxes are passed through the Fresnel lens 206 for condensing the light fluxes and the projection lens 207 to be projected in an enlarged size onto the screen 208.

FIG. 2A shows an example of a color pixel arrangement pattern of such a liquid crystal device 205 equipped with microlenses, including microlenses 211, and pixel electrodes 212 including color pixel electrodes 212r, 212g and 212b corresponding to R, G and B, and each having an aperture 213 as shown in an enlarged size in FIG. 2B. G-light separated and reflected by the dichroic mirrors is incident from an upper position of the microlens 211 vertically to the microlens 211 to be converged at a surface of a G-pixel (electrode) 212. On the other hand, R-light and B-light are respectively incident to the microlens 211 with some angles and converged at the surfaces of R-pixel (electrode) and B-pixel (electrode), respectively, thereby providing somewhat distorted circular spots. Each color pixel may have a TFT-structure, e.g., as shown in FIG. 4.

Each pixel shown in FIG. 4 includes a TFT-structure, formed on glass 101, including a gate 106, a source region 150 connected to a data signal electrode, a drain region 103 accompanied by a lightly doped drain region 107, a drain electrode 108 including laminated layers 108a and 108b, and a pixel electrode 508 connected to the drain electrode 108. Opposite the TFT-substrate 101, a counter substrate 621 (on which microlenses are arranged but are omitted from being shown) is disposed, including a black matrix mask 622, for masking regions between adjacent pixels, and a transparent counter electrode 623. The two substrates 101 and 621 are surfaced with alignment films 4010 and 221 so as to align a liquid crystal 611 disposed therebetween.

Such a known microlens-equipped liquid crystal panel is, however, found to be accompanied by problems as follows when the pixel size, i.e., the size of the apertures, is decreased so as to reduce the panel size. When the size of an aperture 213 is reduced relative to a spot diameter formed by condensation with a microlens 211, the distortion of the spot diameter subtly affects the display characteristic. Particularly, when the sizes of the spot diameter and the aperture are nearly equal, part of the spot diameter can be larger than the aperture 213 size due to a spot diameter distortion caused by oblique light incidence, thus resulting in a lower light utilization efficiency. This affects the brightness and color balance. For obviating such difficulties accompanying lowered light utilization efficiency, pixel sizes are ordinarily based on a pixel requiring a larger aperture, whereby the entire device size is enlarged. If the liquid crystal panel size is enlarged, the optical system size is also enlarged, resulting in an increase in the size of the projection-type liquid crystal display apparatus.

Further, if the pixel size is made smaller, another problem is encountered wherein a region 214 of liquid crystal alignment disorder called "disclination" is caused along one or more sides of a pixel due to a lateral electric field between neighboring pixels, thereby lowering the picture quality. For example, as shown in FIG. 2B (based on a result of analytical study of our research and development group) the alignment films 4010 and 221 (FIG. 4) are rubbed in directions of a solid-line arrow and a dashed-line arrow, respectively, to align homeotropically aligned nematic liquid crystal molecules with a pretilt of 45 degrees in the dashed arrow direction with respect to a normal to the substrates. If the disclination 214 is present in overlapping with a condensed light spot 215, a lowering in contrast leading to a lowering in picture quality, is caused. In order to obviate the hindrance by the disclination 214, it is necessary to reduce the size of the condensed light spot 215 or enlarge each pixel size to lower an effective aperture ratio (i.e., an areal ratio of the aperture 213 to the pixel electrode 212). The latter is contrary to the requirement of a higher resolution. On the other hand, the reduction in size of a condensed light spot requires a complicated optical system. More specifically, light fluxes incident to a microlens are not uniform and uniformization of the light fluxes in one direction before incidence requires a very complicated optical system.

JP-A 7-159771 has proposed a transmission-type color liquid crystal display device wherein color filter segment areas are varied so as to provide a maximum transmittance and an increased color purity of white and respective colors, whereas the use of a color filter is accompanied with a serious drawback of a lowering in brightness.

SUMMARY OF THE INVENTION

In view of the above-mentioned state of the background art, a principal object of the present invention is to provide a liquid crystal device (panel) capable of obviating deterioration of brightness and chromaticity even at a reduced panel size and a liquid crystal display apparatus including such a liquid crystal device.

Another object of the present invention is to provide a liquid crystal device capable of providing a full-color projection image free from mosaic appearance and preventing color mixing at a pixel and a liquid crystal display apparatus including such a liquid crystal device.

A further object of the present invention is to provide a liquid crystal device capable of obviating adverse effects, such as deterioration in brightness and chromaticity, attributable to alignment disorder regions, such as disclination, and a liquid crystal display apparatus including such a liquid crystal device.

According to the present invention, there is provided a liquid crystal device comprising: a layer of liquid crystal, two-dimensionally arranged pixel electrodes disposed so as to apply voltages to the liquid crystal and, together with the liquid crystal, form two-dimensionally arranged pixels each corresponding to one pixel electrode and designed to emit light of one of a plurality of colors, and an array of microlenses disposed to illuminate each pixel with a condensed light spot of illumination light of one of said plurality of colors, wherein pixels of at least one of said plurality of colors are set to have a pixel size different from those of pixels of the other color(s). Herein, the "pixel size" means an effective pixel size which is generally determined by a size of an aperture of a pixel electrode. As a result, it is possible to provide a liquid crystal device capable of exhibiting good color balance and light utilization efficiency while obviating an increase in the entire size of the liquid crystal device.

According to another aspect of the present invention, in the type of liquid crystal device described above, the plural colors are three primary colors; the pixels for the three primary colors are arranged two-dimensionally in a first direction and a second direction, so that pixels for two of the three primary colors are arranged alternately at a first pitch in the first direction, and pixels for a different two of the three primary colors are arranged alternately at a second pitch in the second direction; the microlenses are arranged two-dimensionally at a pitch twice the first pitch in the first direction and at a pitch twice the second pitch in the second direction.

In other words, pixels of a first primary color and a second primary color are arranged alternately at a first pitch in the first direction; pixels of the first primary color and a third primary color are arranged at a second pitch in the second direction; the microlenses are arranged two-dimensionally at a pitch twice the first pitch in the first direction and at a pitch twice the second pitch in the second direction.

When combined with an illumination optical system designed for illuminating the liquid crystal device with the primary color lights from different directions, reflected light fluxes of the primary colors after modulation at three pixels of R, G and B forming a pixel unit are allowed to be emitted through one microlens, thus providing an RGB mosaic-free high quality color picture projection display.

More specifically, the first color illumination light flux is caused to form a condensed light spot (focal spot) at the first color pixel by incidence through a microlens right above the first color pixel and, after reflection, emitted through the same microlens. The second color illumination light flux is caused to form a focal spot at the second color pixel by incidence through a microlens shifted in the first direction from a position right above the second color pixel and, after reflection, emitted through the microlens right above the first color pixel and adjacent to the microlens of incidence. The third color illumination light flux is caused to form a focal spot at the third color pixel by incidence through a microlens shifted in the second direction from a position right above the third color pixel and, after reflection, emitted through the microlens right above the first color pixel and adjacent to the microlens of incidence. As a result, each microlens is caused to emit reflected light fluxes from the first color pixel light therebelow and the second and third color pixels adjacent to the first color pixel in the first and second directions, respectively. More specifically, the first color pixel is disposed right below the center of each microlens, and the second and third color pixels are disposed below boundaries of the microlens with adjacent microlenses in the first and third directions, respectively. In this case, light fluxes from the respective color pixels are made substantially parallel while being passed twice through a microlens, so that it is possible to form a bright projected image on a screen even when using an inexpensive projection lens having a small numerical aperture.

In a preferred embodiment, each microlens is disposed to have an optical axis for forming the condensed light spot, which optical axis is shifted from the center of an associated pixel. As a result, it is possible to form a condensed light spot at an associated pixel while obviating a disclination region in the pixel, whereby the above-mentioned effects are enhanced to provide an effective liquid crystal device free from deterioration of brightness and chromaticity.

According to another aspect of the present invention, there is provided a liquid crystal display apparatus including the above-mentioned liquid crystal device, an illumination means for illuminating the liquid crystal device with illumination light of the plurality of colors so that modulated illumination light of the plurality of colors is emitted from the liquid crystal device, and a projection means for receiving the modulated illumination light emitted from the liquid crystal device to project picture light.

According to still another aspect of the present invention, there is provided a liquid crystal display apparatus including: a plurality of liquid crystal devices each comprising a layer of liquid crystal, and two-dimensionally arranged pixel electrodes disposed so as to apply voltages to the liquid crystal and, together with the liquid crystal, form two-dimensionally arranged pixels each corresponding to one pixel electrode and designed to emit light of one or plural colors; an illumination means for illuminating the plurality of liquid crystal devices with illumination light of corresponding color(s) so that modulated illumination light of the corresponding color(s) is emitted from each liquid crystal device; an optical synthesis means for synthesizing the modulated illumination light emitted from the plurality of liquid crystal devices; and a projection means for receiving the synthesized modulated illumination light to project picture light; wherein pixels of at least one among a total of said one or plural colors of the plurality of liquid crystal devices are set to have a pixel size different from those of pixels of the other color(s).

Further, if the pixel electrodes are constituted as reflective electrodes, it is possible to provide a reflection-type liquid crystal device having a high aperture ratio and providing a bright high quality picture.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 23 is a schematic enlarged plan view illustrating a projected picture on a screen formed by a known projection-type liquid crystal display apparatus including a known microlens-equipped transmission-type liquid crystal panel.

DESCRIPTION OF THE PREFERRED EMBODIMENTS

First Embodiment

Figure 1:
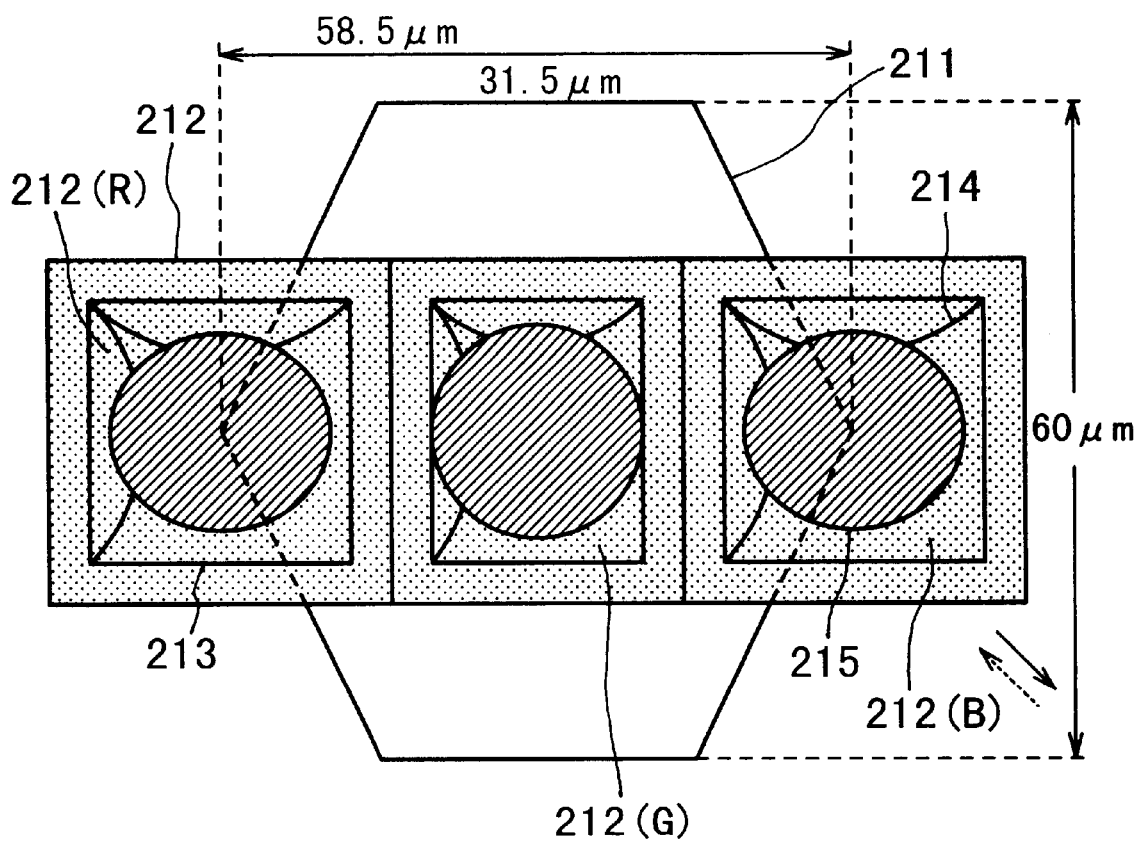
FIG. 1 is a schematic enlarged plan view showing a layout of a pixel unit (including color pixels) and a microlens according to an embodiment of the invention.
Figure 2A:
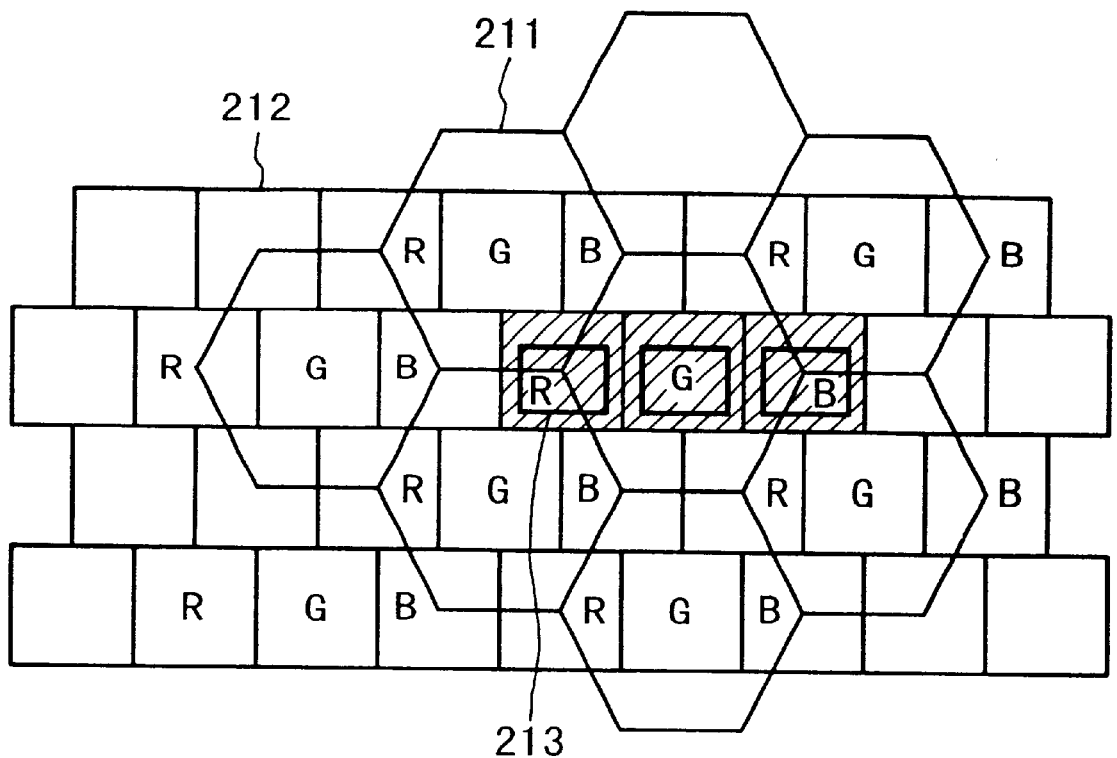
FIG. 2A is a schematic plan view showing a layout of pixels and microlenses in a known single plate-type liquid crystal display device.
Figure 2B:
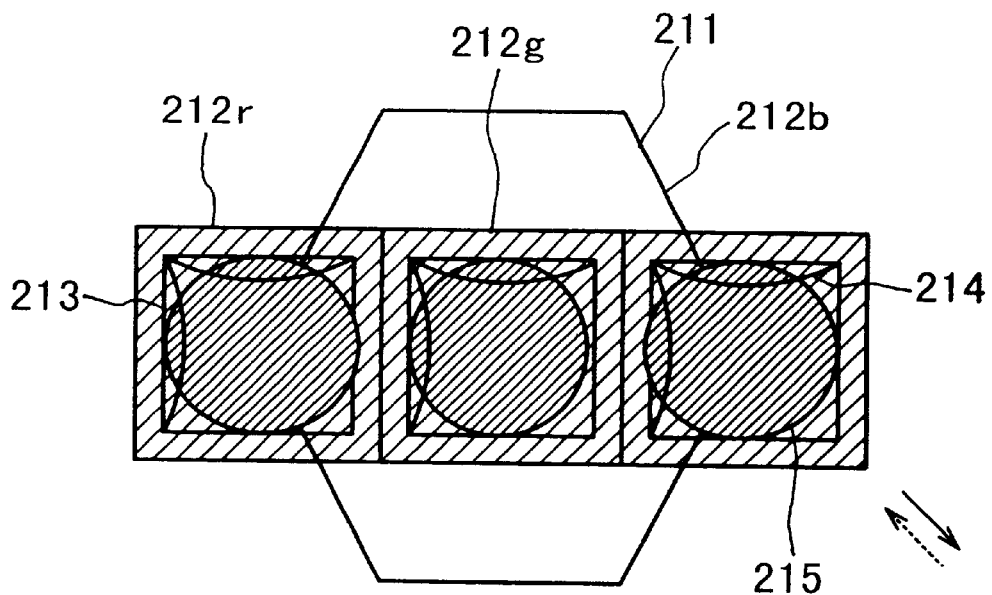
FIG. 2B is a partially enlarged schematic view thereof.
Figure 4:
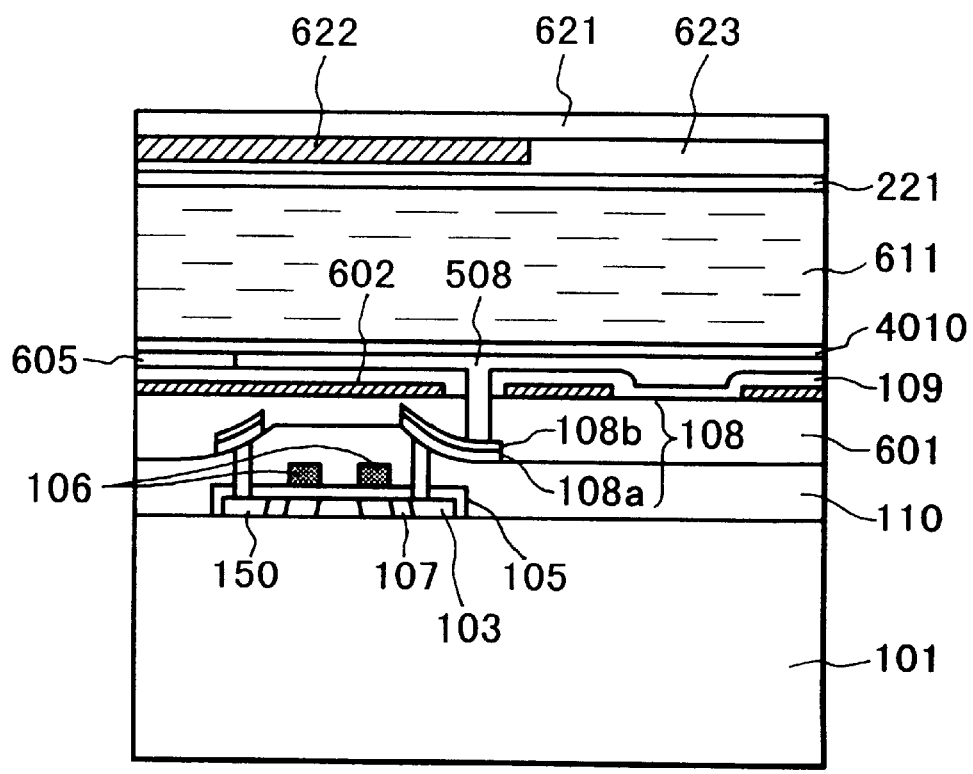
FIG. 4 is a partial sectional view of a liquid crystal device having a pixel layout as shown in FIG. 1.
Figure 10:
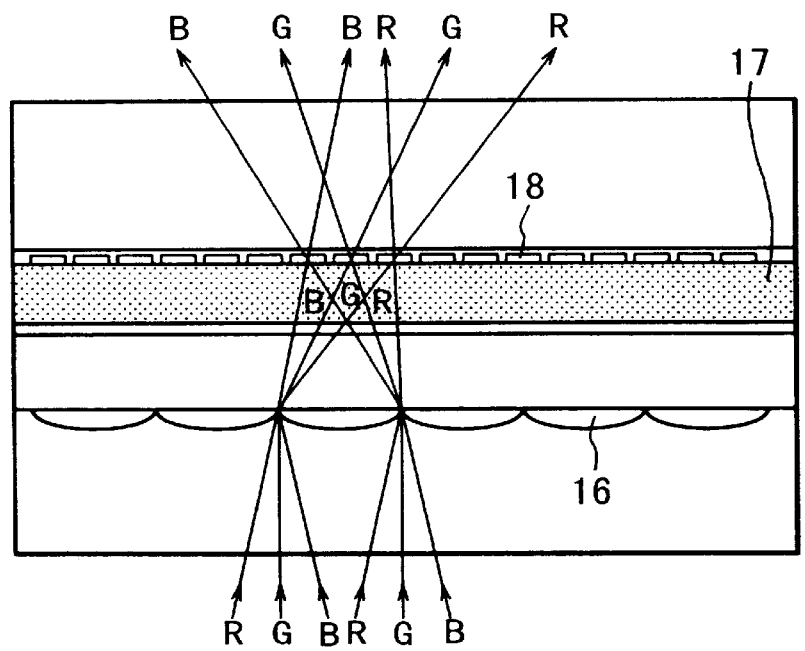
FIG. 10 is an enlarged partial sectional view of a known transmission-type microlens-equipped liquid crystal panel.

A liquid crystal device according to a first embodiment of the present invention will now be described with reference to FIG. 1, which is a plan view for illustrating a positional relationship between a pixel unit including R-, G- and B-pixels and a microlens and corresponds to a portion illustrated in FIG. 2B of a known liquid crystal device. The liquid crystal device has a sectional structure as shown in FIG. 4 or 10. Referring to FIG. 1, the pixel unit includes (color) pixels 212 formed of portions of liquid crystal supplied with voltages via pixel electrodes corresponding to respective colors of R, G and B, and a microlens 211 is disposed so as to form condensed light spots 215 for illuminating the respective (color) pixels with respective color light fluxes. Each pixel 212 includes an aperture 213 constituting an effective pixel area. Different from the pixel arrangement in the known device shown in FIG. 2B, a pixel (G-pixel in this embodiment) 212(G) right below the center of the microlens 211 is designed to have an aperture 213 smaller than apertures 213 of other R- and B-pixels 212(R) and 212(B), and the decreased portion of area of the aperture 213 for the G-pixel 212(G) is allotted to the apertures 213 for the other R- and B-pixels. In a specific example, the G-pixel 212(G) is set to have a pixel size of 27 $\mu$m×30 $\mu$m including an aperture 213 of 15 $\mu$m×20 $\mu$m, and the adjacent R- and B-pixels 212(R) and 212(B) each have a pixel size of 31.5 $\mu$m×30 $\mu$m including an aperture 213 of 21.5 $\mu$m×20 $\mu$m. The microlens 211 provides a spot 215 diameter of ca. 16 $\mu$m at the G-pixel. On the other hand, at the R and B-pixels, the condensed light spots are caused to have shapes of somewhat distorted circles (emphatically illustrated as ovals in FIG. 1). In this embodiment, however, the R- and B-pixels are designed to have larger apertures 213 than the G-pixel, yet these pixels exhibit a substantially identical efficiency as the G-pixel under illumination by a 120 W-UHP lamp (ultra-high pressure mercury lamp). In a specific example, the microlens 211 has a nearly hexagonal shape having dimensions as indicated in FIG. 1 and is disposed with a spacing of 700 $\mu$m from the pixels 212.

Figure 3:
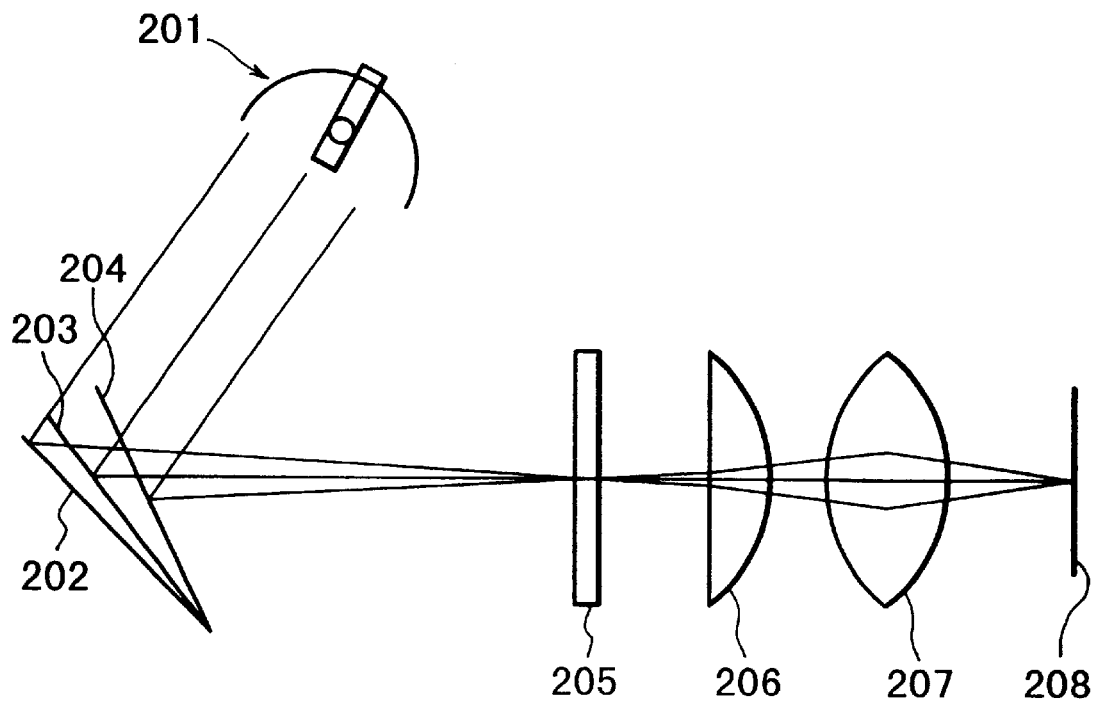
FIG. 3 is an illustration of an optical system of a known single-plate type liquid crystal display apparatus.

The liquid crystal device having a pixel arrangement as shown in FIG. 1 may be incorporated as a liquid crystal device 205 in a projection-type liquid crystal display apparatus having an optical system as shown in FIG. 3. Referring to FIG. 3, a light source 201 may comprise a metal halide lamp or a halogen lamp preferably having a relatively short arc length. Light from the light source 201 is converted into parallel light by a reflector comprising a fly-eye lens so as to provide a high efficiency condenser system in this embodiment. This is, however, not essential, but it is, for example, possible to use a system including an elliptical reflector and a rod integrator, thereby forming scrambled light allowing uniform illumination.

Then, the illuminating light is color-separated by respective dichroic mirrors 202–204 and then incident to a liquid crystal device 205 using a homeotropic alignment liquid crystal for optical modulation according to the ECB (electrically controlled birefringence) mode in this embodiment. Accordingly, the liquid crystal device 205 includes a pair of cross nicol polarizers sandwiching a liquid crystal cell (panel) to provide a normally black display, wherein a dark display state is formed under no voltage application and a bright display state is formed under voltage application with an analog gradation level depending on the voltage. Then, the image light emitted from the liquid crystal device 205 is caused to pass through a Fresnel lens 206 and a projection lens 207 to be projected onto a screen 208. In a specific example, the liquid crystal 611 (FIG. 4) used was a homeotropically aligned nematic liquid crystal ("MLC 6608", available from Merck Co.), and the homeotropic alignment films 4010 and 221 each comprised a 500 Å-thick polyimide film (formed from a polyimide precursor of "JALS 682", available from JSR K.K.). The alignment films 4010 and 221 were rubbed in a solid-line arrow direction and a dashed-line arrow direction, respectively, as shown in FIG. 1, with a 130 mm diameter rubbing roller surface with cotton cloth under the conditions of a pressing depth of 0.5 mm, a feed speed of 30 cm/sec., two times of rubbing and a roller rotation speed of 600 rpm.

In this embodiment, the liquid crystal cell constituting the liquid crystal device 205 has an active matrix-type structure including n-type TFTs as shown in FIG. 4 and similar to the above-described prior art device. This is, however, not essential. It is possible to use a simple matrix-type liquid crystal cell. Further, instead of the n-type TFT substrate, it is also possible to use a p-type TFT substrate or a C-MOS substrate. It is also possible to use a semiconductor substrate provided with locally etched apertures or an SOI (silicon on insulator) substrate.

Figure 5:
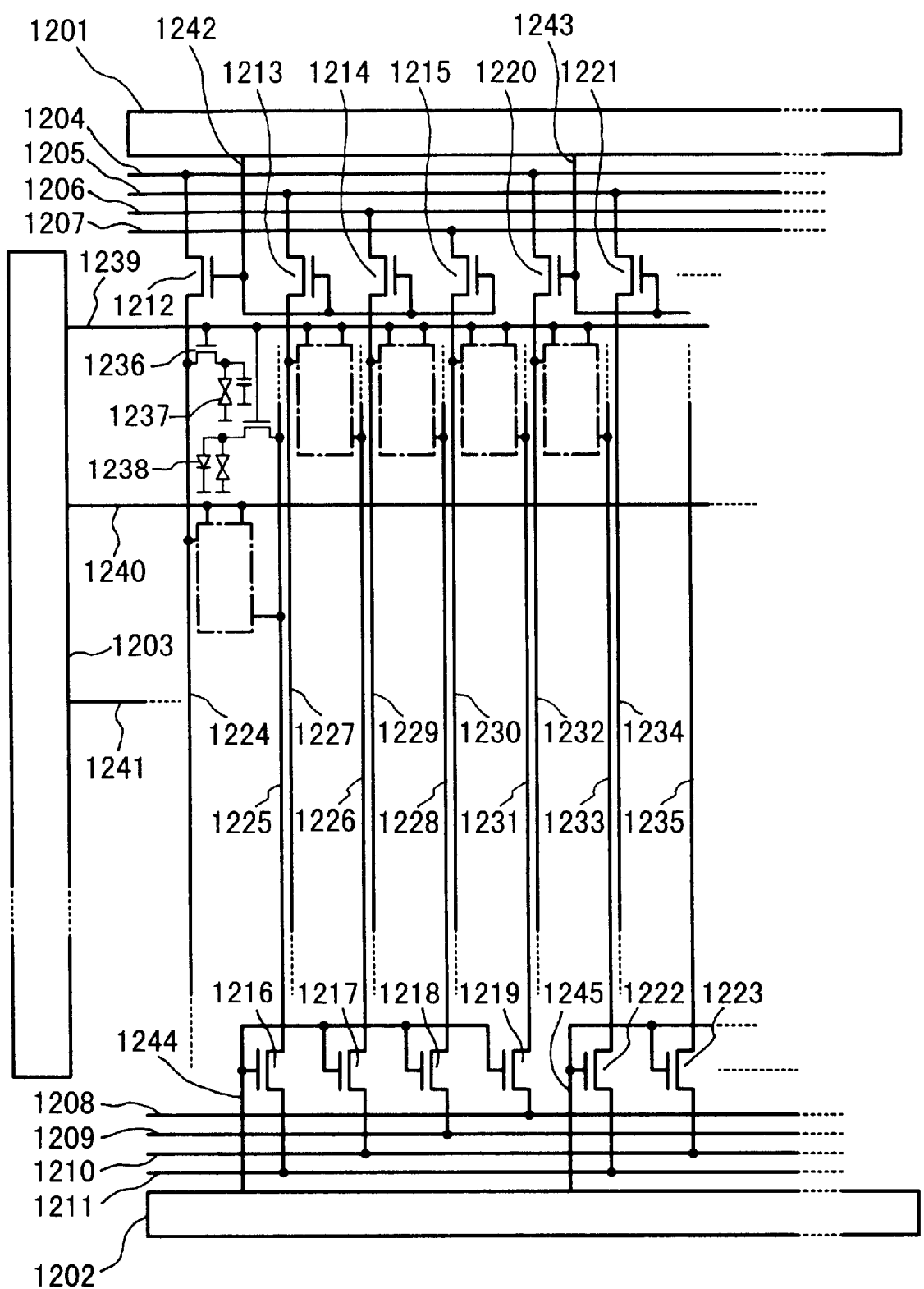
FIG. 5 illustrates a circuit arrangement on an active matrix substrate of a liquid crystal device having a pixel layout as shown in FIG. 1.

The liquid crystal at the respective pixels in the liquid crystal device is driven by voltage application from an active matrix drive circuit structure as represented by an equivalent circuit structure shown in FIG. 5 including horizontal shift registers 1201 and 1202; a vertical shift register 1203; video signal lines 1204–1209, 1210 and 1211 for supplying video signals; sampling MOS transistors 1212–1223 for sampling the video signals depending on scanning pulses from the horizontal shift registers 1201 and 1202; data signal lines 1224–1235 for supplying video signals from the sampling MOS transistors 1212–1223 to the respective TFTs; switching MOS transistors (TFTS) 1236 each designed for applying a voltage depending on a video signal supplied thereto to a liquid crystal 1237 disposed between a pixel electrode and the counter electrode and accompanied with a supplemental capacitor 1238 formed adjacent to the pixel electrode.

Each row of TFTs 1236 are sequentially selected by a horizontal scanning signal supplied from the vertical shift register 1203 via horizontal scanning drive lines 1239–1241, and the supply of video signals to the data signal lines 1224–1235 is controlled by the sampling MOS transistors 1212–1223 driven by signals via vertical scanning drive lines 1242–1245 supplied from the horizontal shift registers 1201 and 1202.

More specifically, as an operation of the drive circuit, inputted video signals are sampled by the sampling MOS transistors 1212–1223 based on vertical scanning control signals supplied thereto via the lines 1242–1245 from the horizontal shift registers 1201 and 1202 and supplied to the vertical video signal lines 1224–1235. At this time, if a horizontal scanning control signal supplied via a first horizontal scanning drive line 1239 is high, the switching MOS transistors 1236 on the first row are turned on so that the sampled video signals are supplied to the respective pixels on the first row to provide the respective pixels with corresponding potentials. The respective pixels on subsequent rows are sequentially supplied with respective potentials based on picture data prescribed therefor in synchronism with sequential selection of horizontal scanning drive lines 1240, 1241, . . . and synchronous turning on of the sampling MOS transistors 1212–1223.

Figure 6:
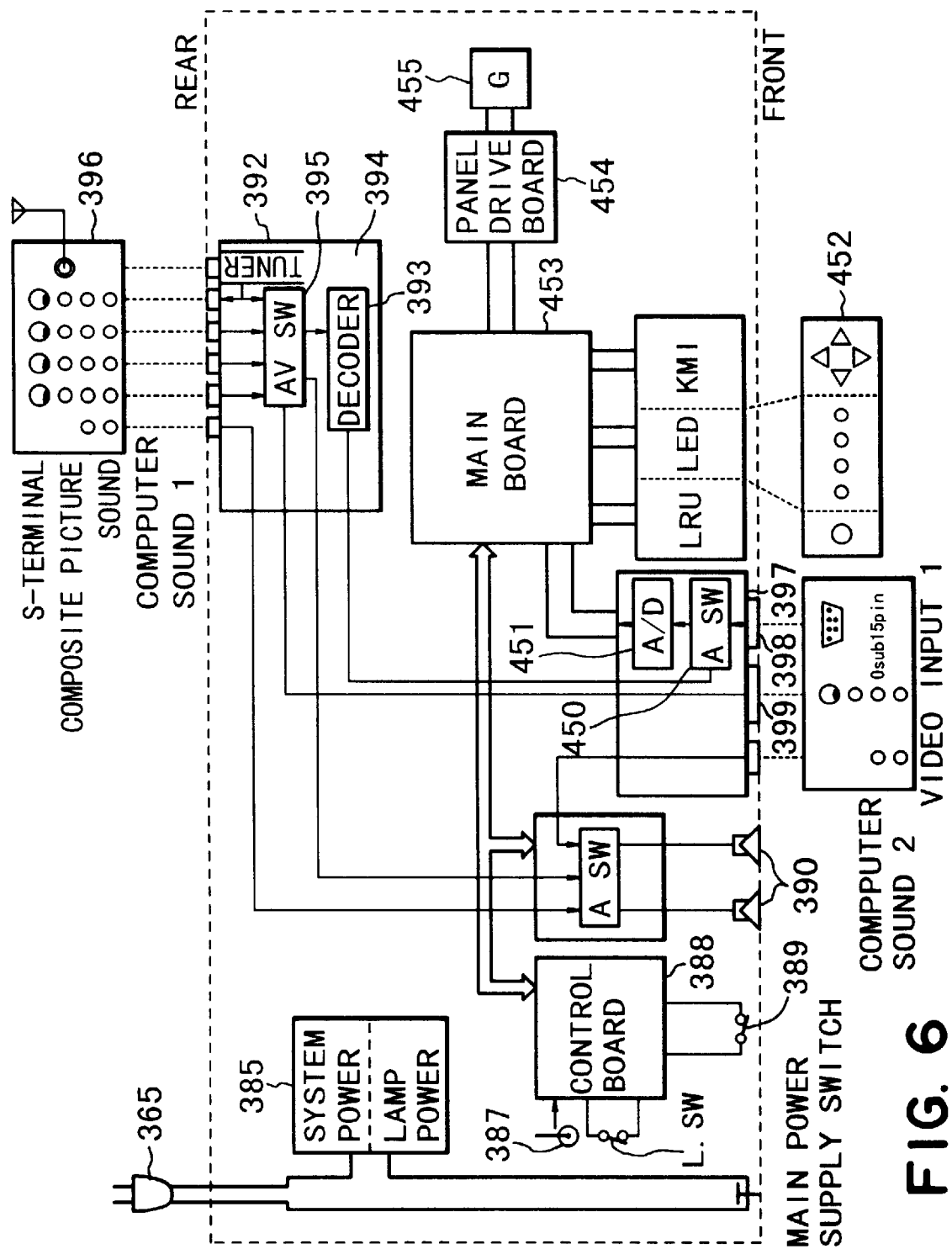
FIG. 6 is a block illustration of a peripheral electric circuit around a liquid crystal device having a pixel layout as shown in FIG. 1.

The liquid crystal device (panel) can be driven by a peripheral electrical circuit as shown in FIG. 6. Referring to FIG. 6, the circuit includes a power supply 385 roughly divided into a lamp power supply and a system power supply for driving a panel and a signal processing circuit; a plug 386; and a lamp temperature detector 387 for detecting a lamp temperature abnormality, based on which a control board 388 effects a control, such as turning off of the lamp by a lamp safety switch L. SW. A similar control may also be performed by a filter safety switch 389. For example, a safety measure is included such that a high temperature lamp house box cannot be opened even if it is tried.

The system also includes speakers 390 connected to a sound board 390 which can include processors for 3D sound or surround sound, as desired. A first extended function board 392 includes input terminals connected with an external device 396 having a video signal terminal S-terminal and terminals for video signal composite picture signal and sound signal, a signal selection switch 395, and a tuner 394, and is designed to send signals via a decoder 393 to a second extended function board 397. The second extended function board 397 includes a Dsub 15 pin terminal of a computer and principally functions to receive video input 1 and computer sound 2 from another channel via terminals 398 and 399 to convert these signals or video signals from the decoder 393 received via a changeover switch 450 into digital signals with an A/D converter 451.

The digital signals (NTSC signals) formed by the A/D converter 451 are sent to a main board 453 principally comprising a memory, such as a video RAM, and a CPU. The digital signals received by the main board are once stored in the memory and then subjected to signal processing, such as preparation of insufficient signals for vacant pixels by interpolation required for comprising a larger number of liquid crystal pixels, γ-conversion or edge gradation, brightness adjustment, and bias adjustment. In addition to the NTSC signals, computer signals are also processed, such as a resolution conversion for a higher resolution XGA panel on receiving VGA signals.

The main board 453 also effects further processing, such as synthesis of computer signals based on NTSC signal data for plural pictures in addition to one picture. The output from the main board 453 is subjected to serial/parallel conversion to form a signal in a form less susceptible to noise, which signal is then supplied to a panel drive head board 454. At the head board 454, the signal data is subjected to parallel/serial conversion and then D/A conversion to be divided into a number of signals corresponding to panel drive lines. The signals are supplied via a drive amplifier to drive the liquid crystal panel (G) 455.

The system also includes a remote control operation panel 452 directed to a remote controller light-receiving unit LRU, an LED display unit and a key matrix input unit KMI for adjustment of the main board, whereby a computer picture can be achieved in a simple manner similarly to that for a television picture. In FIG. 6, only a single plate-type liquid crystal panel 455 (G) is shown, but it is also possible to constitute a peripheral circuit basically in a similar manner also in the case where a plurality of liquid crystal devices are connected to the main board.

Incidentally, the present invention is not limited to embodiments specifically described herein. For example, a plurality of embodiments described herein can be combined to attain the effects of plural embodiments in combination. Further, the liquid crystal panel (liquid crystal device) described above includes a semiconductor substrate, but can also have a structure as described hereinafter including a transparent substrate. The embodiments of the liquid crystal device herein are described to include MOS-FET or TFT drivers, but two-terminal driver devices, such as diodes can also be used. The liquid crystal panel described herein can be effectively used as a display device for a home television set, as a matter of course, a projector, a head-mount display, a 3-dimensional picture game set, a lap-top computer, an electronic notebook, a television conference system, a car navigator, and a flight panel for airplanes.

In a specific example of a liquid crystal device having different areas of apertures 213 for respective colors as described above, the following chromaticity coordinate values of x and y for monochromatic display and white display have been obtained. That is, x=0.15 and y=0.15 for blue color display, x=0.29 and y=0.60 for green color display, x=0.60 and y=0.33 for red color display, and x=0.30 and y=0.31 for white color display. Thus, it is possible to realize desired color balance and high efficiency while retaining chromaticity of respective colors and without enlarging the chip size. Accordingly, as a result of optimum pixel designing in the above-described manner, it is possible to provide a small liquid crystal device and a liquid crystal display apparatus including the liquid crystal device with good color balance.

In the above, there has been raised an example wherein relative to a G-pixel disposed right below (or above) the center of the microlens, the sizes of R- and B-pixels are enlarged by attaching great importance to light utilization efficiency and color balance. This is not essential. For example, it is also possible to design apertures of respective colors so as to provide an optimum system balance with additional consideration on properties of the lamp and optical system. In the above example, two of three colors R, G and B are designed to have identical aperture sizes, but it is also possible to provide all three color pixels with mutually different aperture sizes. Further, the above example uses a transmission-type panel including a TFT-substrate, but it is also possible to use a panel including an amorphous silicon substrate or a reflection-type panel.

Second Embodiment

Figure 7A:
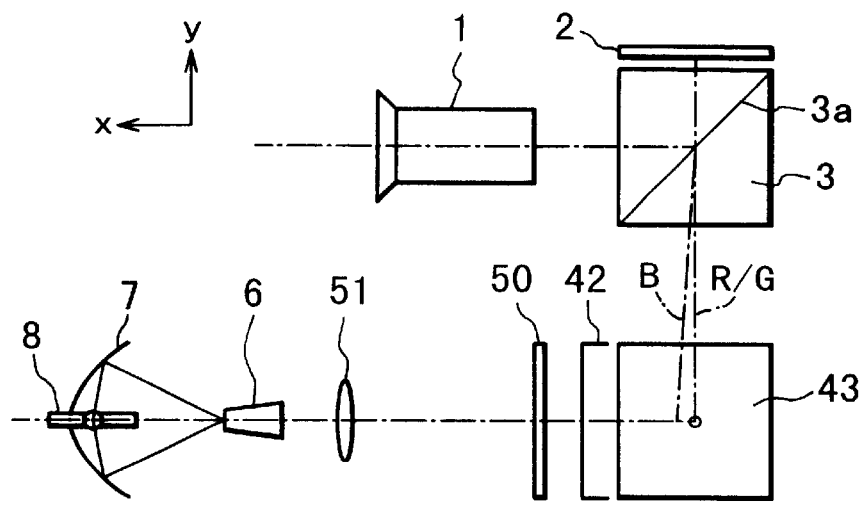
FIGS. 7A–7C are illustrations of an entire optical system of a projection-type liquid crystal display apparatus according to a second embodiment of the invention as viewed from three directions.
Figure 7B:
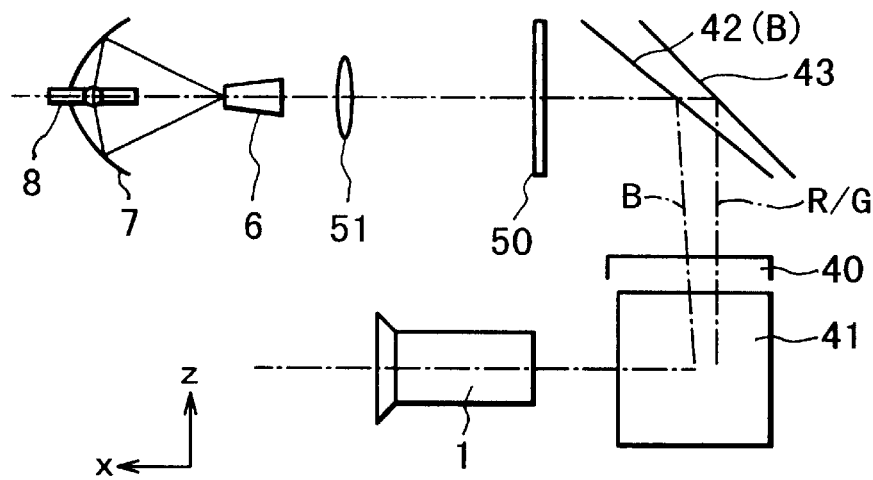
Figure 7C:
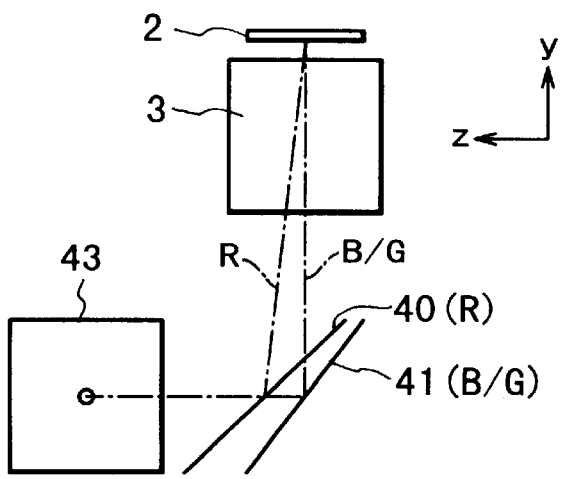
Figure 9:
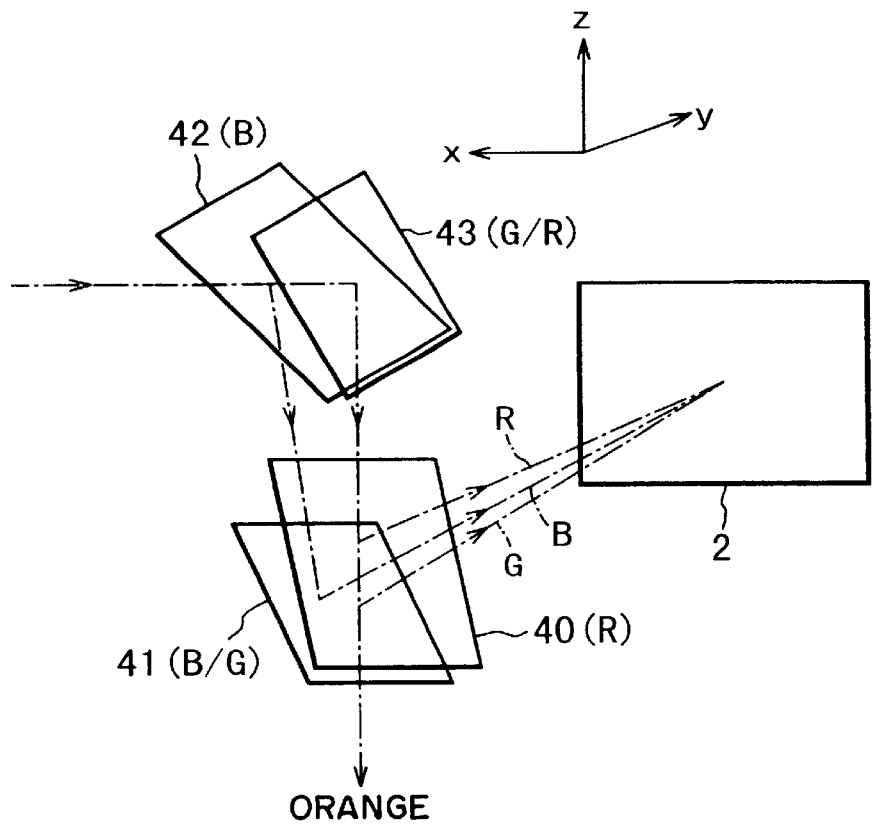
FIG. 9 illustrates a perspective organization of a color separation illumination unit in the apparatus of FIGS. 7A–7C.

FIGS. 7A–7C illustrate an optical system organization of a projection-type liquid crystal display apparatus according to the present invention as viewed on an x-y coordinate system, an x-z coordinate system and a y-z coordinate system, respectively, and FIG. 9 illustrates a perspective view of a portion of the system. Referring to these figures, the liquid crystal display apparatus system includes an arc lamp 8, as a white light source, such as a metal halide lamp or a UHP lamp; an elliptical reflector for reflecting and condensing light from the lamp 8; a rod-type integrator 6 for receiving reflected light from the elliptical reflector 7; a convex lens 51 and a Fresnel lens 50 for converting emitted light from the integrator 6 into parallel light fluxes; an R (red)-light reflection dichroic mirror 40, a B/G (blue & green)-light reflection dichroic mirror 41, a B (blue)-light reflection dichroic mirror 42, a high-reflectance mirror 43 for reflecting all light fluxes for color-separating white illumination light from the Fresnel lens 50 into R, G and B; a polarization beam splitter (PBS) 3 for polarizing color-separated illumination light; a microlens-equipped liquid crystal panel 2 illuminated with the polarized illumination light; and a projection lens 1 for projecting a picture formed by the illuminated liquid crystal panel 2.

Figure 8A:
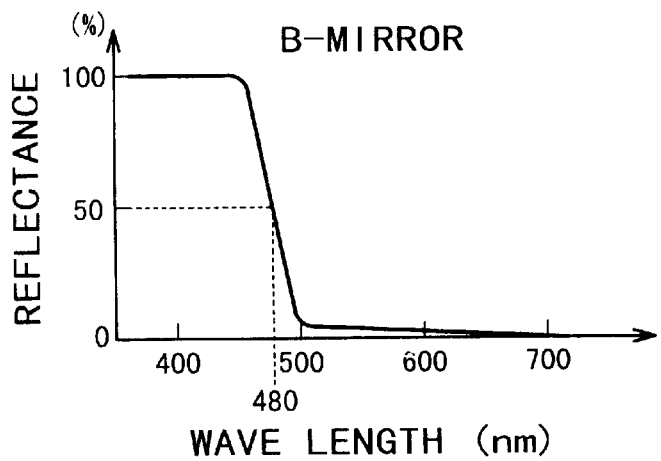
FIGS. 8A–8C show spectral reflection characteristics of B-, B/G- and R-dichroic mirrors, respectively, used in the apparatus of FIGS. 7A–7C.
Figure 8B:
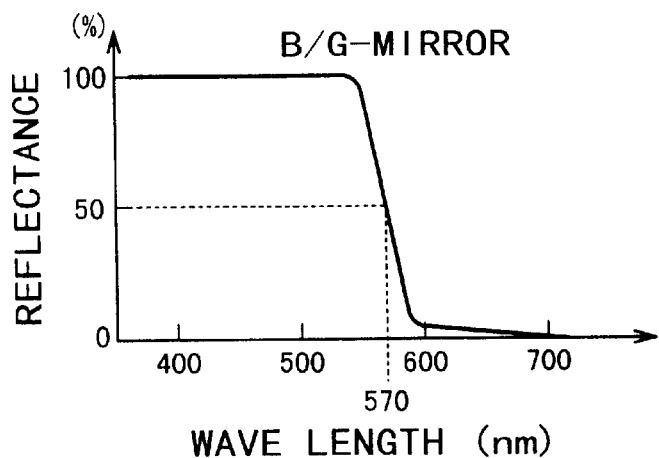
Figure 8C:
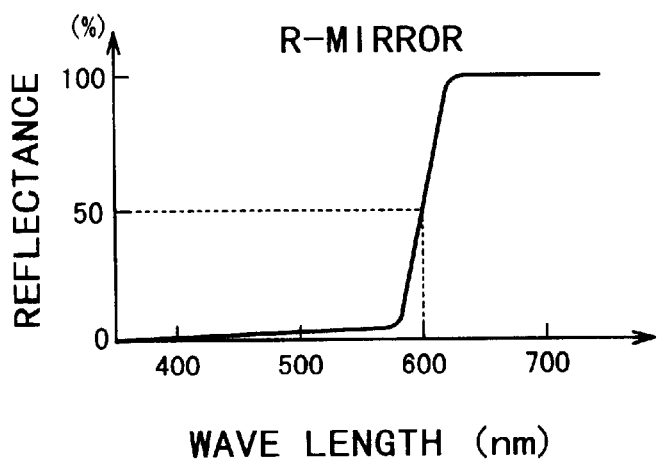

Herein, the R (red)-reflection dichroic mirror 40, the B/G (blue & green)-reflection dichroic mirror 41 and B (blue)-reflection dichroic mirror 42 have spectral reflection characteristics as shown in FIGS. 8C, 8B and 8A, respectively. These dichroic mirrors are disposed three-dimensionally together with the high reflectance mirror 43 as shown in a perspective view of FIG. 9, whereby white illumination light is separated into three primary color lights of R, G and B, which are then caused to illuminate the liquid crystal panel 2 in three-dimensionally different directions, as will be described later.

Now, the process of light flux progress will be described. First, white light flux emitted from the light source 8 is condensed by the elliptical reflector 7 at an entrance of the integrator 6 disposed in front of the elliptical reflector 7 and caused to proceed through the longitudinal body of the integrator 6 while causing repetitive reflection within the body for uniformizing the spatial intensity distribution thereof. Then, the light flux emitted from the integrator 6 is passed through the convex lens 51 and the Fresnel lens 50 to be converted into parallel light flux in a negative (−) direction along the x-axis of FIG. 7B and reach the B-reflection dichroic mirror 42.

At the B-reflection dichroic mirror 42, only the B (blue)-light fraction is reflected and directed downward in a negative direction generally along the z-axis with a prescribed angle from the z-axis toward the R-reflection dichroic mirror 40. On the other hand, the other color light fractions (RG lights) are passed through the B-reflection dichroic mirror 42 to reach the high-reflectance dichroic mirror 43 and are reflected thereat at a right angle downwardly in a negative (−) direction along the z-axis also toward the R-reflection dichroic mirror 40.

Thus, the B-reflection dichroic mirror 42 and the high reflectance mirror 43 are both disposed so as to reflect the light flux incident thereto in the negative (−) direction along the x-axis into the downward direction with reference to FIG. 7B. Further, the high-reflectance mirror 43 is disposed (or rotated) at an angle of just 45 degrees, and the B-reflection dichroic mirror 42 is disposed at an angle slightly smaller than 45 degrees, respectively, from the x-y plane with respect to the y-axis as a rotation axis.

As a result, the R/G lights are reflected by the high-reflectance mirror at a right angle downwardly in the negative direction along the z-axis, while the B-light is reflected by the B-reflection dichroic mirror downward in a direction forming a prescribed angle (tilted in an x-z plane) from the z-axis. In this embodiment, so as to provide an alignment of the illumination region on the liquid crystal panel 2 with the B-light and the R/G-light, the amount of shift from the high reflectance mirror 43 and the amount of tilt of the B-reflection dichroic mirror 42 are determined so as to have the principal rays of the respective color lights intersect with each other on the liquid crystal panel 2.

Then, the downwardly directed B-light and R/G light are directed to the R-reflection dichroic mirror 40 and the B/G-reflection dichroic mirror 41. In this embodiment, these dichroic mirrors 40 and 41 are disposed below the B-reflection dichroic mirror 42 and the high reflectance mirror 43. Further, the B/G-reflection dichroic mirror 41 is disposed (or rotated) at an angle of 45 degrees, and the R-reflection dichroic mirror 41 is disposed at an angle slightly smaller than 45 degrees, respectively from the x-z plane with respect to the x-axis as a rotation axis.

Accordingly, among R/G/B light fractions, entering these dichroic mirrors, B/G lights are caused to pass through the R-reflection dichroic mirror 40 and are reflected by the B/G-reflection dichroic mirror 41 at a right angle into a positive (+) direction along the y-axis and passed through the PBS 3 to be polarized and illuminate the liquid crystal panel 2. Of these, the B-light flux has been directed in a direction tilted at a prescribed angle with respect to the z-axis (in the x-z plane as described with reference to FIGS. 7A and 7B) and, after being reflected by the B/G-reflection dichroic mirror 41, is incident to the liquid crystal panel 2 while retaining the prescribed angle (tilted from the y-axis) as an incidence angle (tilted in the x-y plane).

The G-light is reflected perpendicularly at the B/G-reflection dichroic mirror to proceed in a positive (+) direction along the y-axis and then polarized by the PBS 3, thereby illuminating the liquid crystal panel 2 at an incidence angle of 0 degree, i.e., perpendicular to the liquid crystal panel 2. Further, the remaining R-light is reflected by the R-reflection dichroic mirror 40 disposed before the B/G-reflection dichroic mirror 41 in a positive (+) direction along the y-axis with a prescribed angle (tilted from the y-axis in the y-z plane) and polarized through the PBS 3 to illuminate the liquid crystal panel 2 with the prescribed tilt angle as an incidence angle from the y-axis in the y-z plane, as shown in FIG. 7C.

Similarly as the high reflectance mirror 43 and the B-reflection dichroic mirror 42, the amounts of shift from the B/G-reflection dichroic mirror 41 and tilt of the R-reflection dichroic mirror 40 are determined so as to have the principal rays of the respective color lights intersect with each other on the liquid crystal panel 2, thereby aligning the illumination regions by the respective color lights on the liquid crystal panel 2. Further, in this embodiment, as shown in FIGS. 8B and 8C, the cut wavelengths by the B/G-reflection dichroic mirror 41 and by the R-reflection dichroic mirror 40 are determined at 570 nm and 600 nm, respectively, so that an unnecessary orange light fraction is passed through the B/G-reflection dichroic mirror 41 to be discarded, thereby ensuring an optimum color balance.

Then, the respective lights of R, G and B incident to the liquid crystal panel 2 are reflected while receiving polarization modification to return to the PBS 3, from which light flux reflected in a positive (+) direction along the x-axis is emitted as a picture light and projected through the projection lens 1 onto a screen (not shown), as will be described hereinafter. Incidentally, the R, G and B lights are incident to the liquid crystal panel 2 at mutually different incident angles and therefore the R, G and B lights reflected therefrom have different emission angles, so that the projection lens 1 is designed to have a diameter and an aperture sufficient to wholly capture these color lights.

Incidentally, in the case of a reflection-type liquid crystal display apparatus of this embodiment, the inclination of color lights incident to the liquid crystal panel is rather moderated by a paralleling action due to passing through the microlenses of the respective color lights twice. On the other hand, in a conventional transmission-type liquid crystal display apparatus as illustrated in FIG. 10, the light flux emitted from the liquid crystal panel 2 is further spread due to enhancement by the focusing action of the microlenses, so that an expensive projection lens having a large numerical aperture has been required in order to capture such spread light. In this embodiment, however, the spreading of emitted light from the liquid crystal panel 2 can be relatively suppressed, so that a projection lens having a relatively small numerical aperture can provide a sufficiently bright projection picture, thus allowing the use of an inexpensive projection lens.

Figure 11:
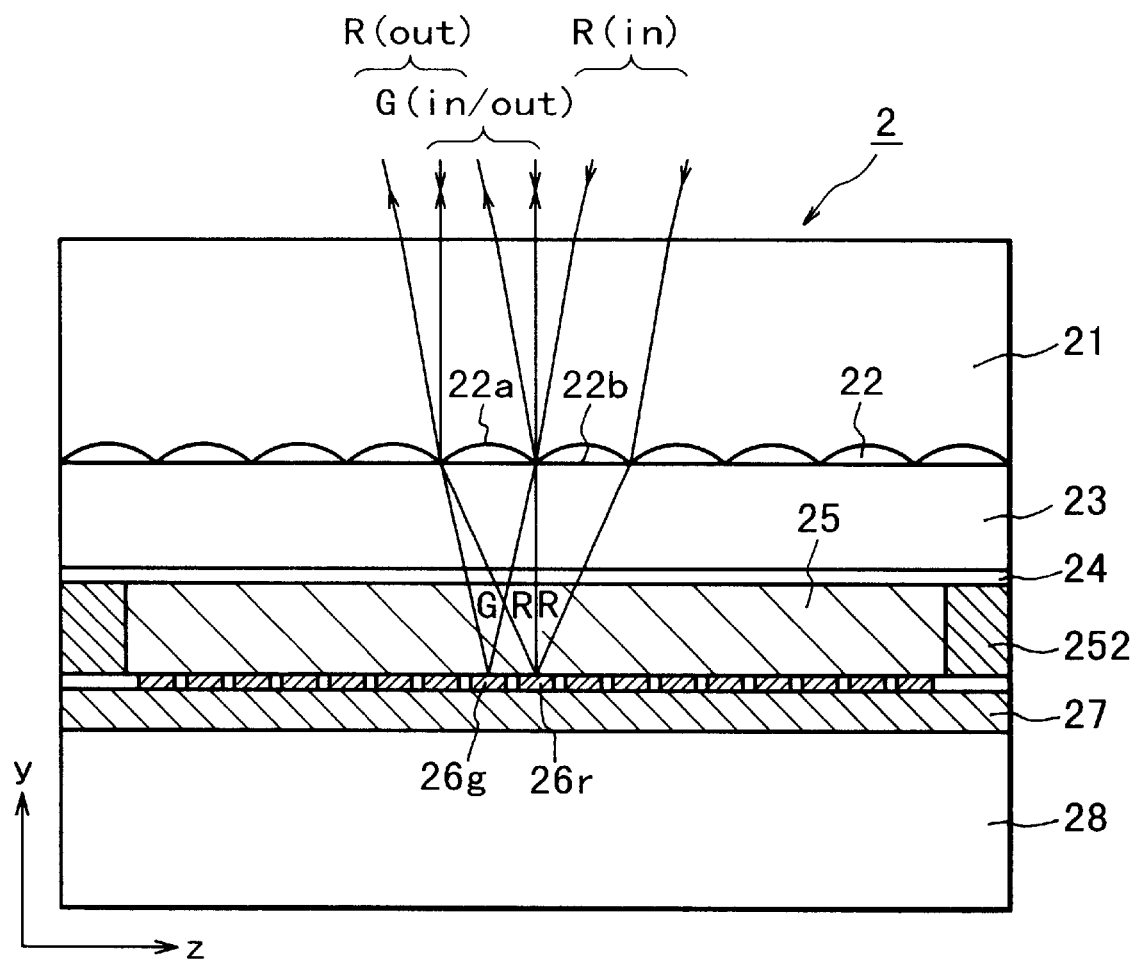
FIG. 11 is a schematic sectional view of a liquid crystal device used in the apparatus of FIGS. 7A–7C.

Then, details of a liquid crystal panel 2 to be used in the present invention will be described with reference to FIG. 11, which is a schematically enlarged view of a section of the liquid crystal panel 2 taken along the y-z plane in FIG. 7C. Referring to FIG. 11, the liquid crystal panel 2 includes a silicon semiconductor substrate 28, an active matrix drive circuit unit 27 formed on the silicon semiconductor substrate 28 and having a detailed structure similar to those described with reference to FIG. 4, microlenses 22 formed along a surface of a glass substrate 21, a glass sheet 23 disposed below the glass substrate 21, a transparent counter electrode 24 disposed on the glass sheet 23, pixel electrodes 26 (including 26g and 26r) disposed opposite to the transparent counter electrode 24, and a liquid crystal disposed between the electrodes 24 and 26.

The microlenses 22 are formed on one surface of a glass substrate 21 of alkaline glass through the so-called ion-exchange process so as to form a two-dimensional array structure at a pitch which is twice as large as that of the pixel electrodes 26. The liquid crystal layer 25 comprises a nematic liquid crystal of the ECB (electrically controlled birefringence) mode, inclusive of the DAP (deformation of aligned phases) mode using a homeotropically aligned nematic liquid crystal having a negative dielectric anisotropy and the HAN (hybrid alignment nematic) mode using a nematic liquid crystal having a positive or negative dielectric anisotropy. These liquid crystals are respectively aligned in a specific form using an alignment film in contact therewith, which causes a pretilt of liquid crystal molecules and inevitably causes a destination along at least one side, generally two sides, of a rectangular pixel as has been discussed with reference to FIGS. 21 and 2. The pixel electrodes 26 (inclusive of 26g, 26r, etc.) comprise Al and also function as a reflection mirror. For this purpose, the Al electrodes 26 have been subjected to the so-called CMP (chemical mechanical polishing) process after patterning thereof so as to provide a good surface characteristic exhibiting an enhanced reflectivity.

The active matrix drive unit 27 is a semiconductor circuit formed on the silicon semiconductor substrate 28 and supplies drive voltages to the respective pixel electrodes 26 according to the active-matrix drive mode. At a peripheral part surrounding or neighboring the matrix circuit, a peripheral drive circuit (not shown) inclusive of gate line drivers such as a vertical shift register and data line drivers such as a horizontal shift register is disposed as described with reference to FIG. 5. These peripheral drive circuits are designed so as to write in prescribed display states at respective color pixels R, G and B based on given primary color signals of R, G and B. Each pixel electrode 26 is not provided with a color filter segment but can be discriminated as one of R, G and B pixels based on a primary color signal supplied thereto, thereby forming a prescribed arrangement of R, G and B pixels as described hereinafter.

Now, referring to FIG. 11, G-light for illuminating the liquid crystal panel 2, for example, is noted. As mentioned before, after being polarized through the PBS 3, the G-light is vertically incident to the liquid crystal panel 2. Among the G-color rays, a G-color ray incident to one microlens 22a is represented by arrows G (in/out) in FIG. 10. As shown in FIG. 11, G-light is condensed by the microlenses 22a to illuminate a G-pixel electrode 26g and reflected by the pixel electrode 26g composed of Al to be emitted out of the liquid crystal panel 2 again through the same microlens 22a.

During the reciprocal passage through the liquid crystal layer 25, the polarized G-light is optically modulated by the liquid crystal 25 driven by an electric field formed between the pixel electrode 26g and the counter-electrode 24 based on a data voltage applied to the pixel electrode 26g, and then emitted from the liquid crystal panel 2 to return to the PBS 3. Then, depending on the degree of modulation received at the liquid crystal layer 25, the G-light is reflected at a different degree at a boundary 3a of the PBS 3 toward the projection lens 1, thereby exhibiting a density gradation at the pixel 26g.

Then, R-light incident to the liquid crystal panel 2 in an oblique direction in a section (y-z plane as shown in FIG. 7C) of the panel 2 is noted in FIG. 11. Also after being polarized through the PBS 3, e.g., an R-light ray denoted by arrows R(in) incident to a microlens 22b is condensed by the microlens 22b to illuminate a pixel electrode 26r which is located at a position shifted leftward from a position directly below the microlens 22b. Then, the R-light R(in) is reflected by the pixel electrode 26r and then emitted as a light ray denoted by arrows R(out) through a microlens 22a which neighbors and is shifted leftward (i.e., in a negative (−) direction along the z-axis) from the microlens 22b through which it has entered the liquid crystal panel 2. During the passage through the liquid crystal layer 25, the polarized R-light is optically modulated by the liquid crystal 25 driven under an electric field between the pixel electrode 26r and the counter-electrode 24 based on a data voltage applied to the pixel electrode 26r to be emitted out of the liquid crystal panel 2 and return to the PBS 3. Thereafter, the R-light is projected as a portion of picture light having a gradation level depending on the received optical modulation in the same manner as the above-described G-light.

Incidentally, FIG. 11 appears to illustrate a state where the G-light and the R-light above the pixel electrodes 26g and 26r appear to overlap each other, thus causing interference with each other. However, this is simply because the thickness of the liquid crystal layer 25 is schematically enlarged for easy comprehension. The actual thickness of the liquid crystal layer 25 is on the order of 5 $\mu$m, which is much smaller than 50–100 $\mu$m of the sheet glass 23, so that such interference does not actually occur regardless of the pixel size. Incidentally, the counter electrode 24 has a thickness on the order of 1000 Å. In a specific example, a homeotropically aligned nematic liquid crystal material ("MLC 6608", available from Merck Co.) as used in the first embodiment may be used together with alignment film materials and rubbing conditions similar to those adopted in the first embodiment.

Figure 12A:
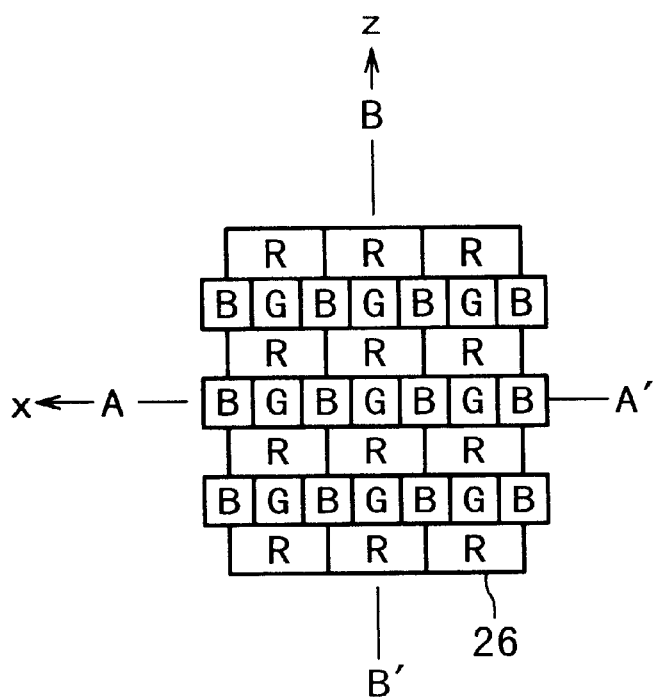
FIGS. 12A–12C are a plan view and sectional views for illustrating principles of color separation and color synthesis according to the liquid crystal device in the apparatus of FIGS. 7A–7C.
Figure 12C:
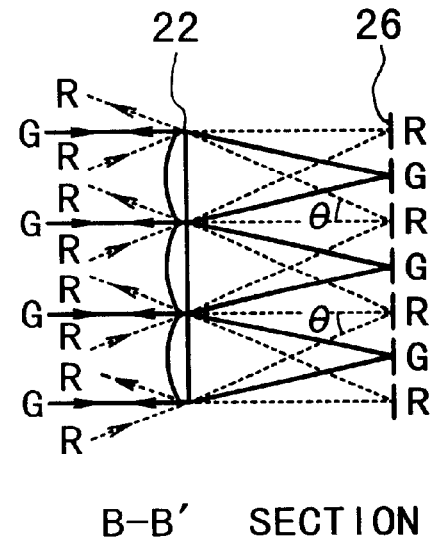
Figure 12B:
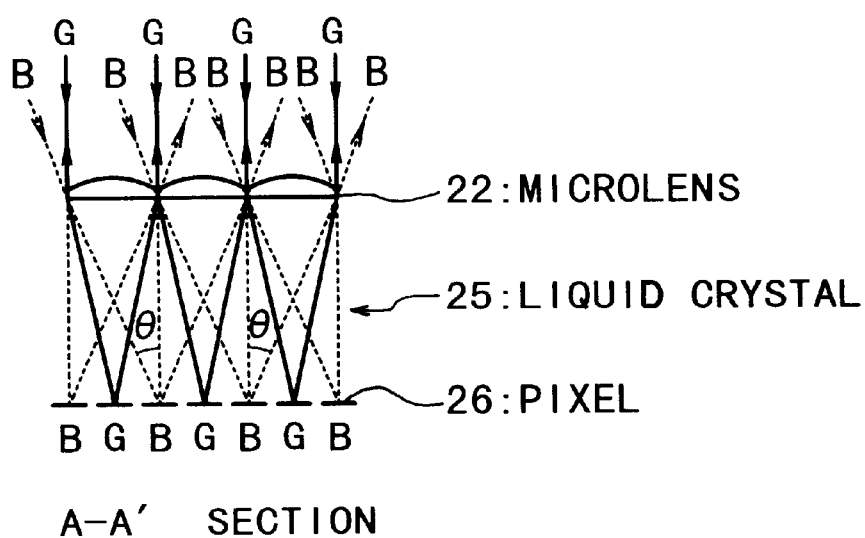

The principle of color separation and color synthesis according to this embodiment is explained with reference to FIGS. 12A–12C. FIG. 12A is a schematic top plan view of the liquid crystal panel 2, and FIGS. 12B and 12C are schematic sectional views of this panel 2 taken along line A–A' (x-direction) and line B–B' (y-direction), respectively, in FIG. 12A. Among these, FIG. 12C shows a section along the y-z plane, corresponding to FIG. 11, and illustrates the manners of incidence and emission of the G-light and R-light through respective microlenses 22.

As is understood from FIG. 12C, each G-pixel electrode 26 is disposed right below the center of an associated microlens 22, and each R-pixel electrode 26 is disposed right below a boundary between associated neighboring microlenses 22. Accordingly, it is preferred that the incident angle $\theta$ of R-light is set to provide a value of tan $\theta$ that is equal to a ratio between a pixel pitch (between G- and R-pixels) and a distance between a microlens and a pixel electrode.

On the other hand, FIG. 12B shows an x-y section of the liquid crystal panel 2. Along the x-y section, B-pixel electrodes and G-pixel electrodes are alternately disposed similar to FIG. 12C. Thus, each G-pixel electrode is disposed right below the center of an associated microlens, and each B-pixel electrode is disposed right below a boundary between associated neighboring microlenses. Then, B-light illuminating the liquid crystal panel is incident to the liquid crystal panel in an oblique direction along the x-y plane after polarization through the PBS 3, so that B-light incident through a microlens is reflected by a B-pixel electrode and emitted through a microlens neighboring the microlens for the incidence in the x-direction, as shown in FIG. 12B and in quite the same manner as R-light. The B-light entering the B-pixel electrode is modulated by the liquid crystal adjacent to the B-pixel electrode and projected after being emitted out of the liquid crystal panel in the same manner as G-light and R-light described above.

Further, it is also preferred that each B-pixel electrode is disposed right below a boundary between associated neighboring microlenses, and B-light is incident to the liquid crystal panel at an angle $\theta$ giving a tan $\theta$ that is equal to a ratio between a pixel pitch (between G- and B-pixels) and a distance between the microlens and the pixel electrode. In the liquid crystal panel according to this embodiment, the (color) pixels of R, G and B are arranged in the order of RGRGRG . . . in the z-direction and in the order of BGBGBG . . . in the x-direction (as shown in FIG. 12A).

Figure 13:
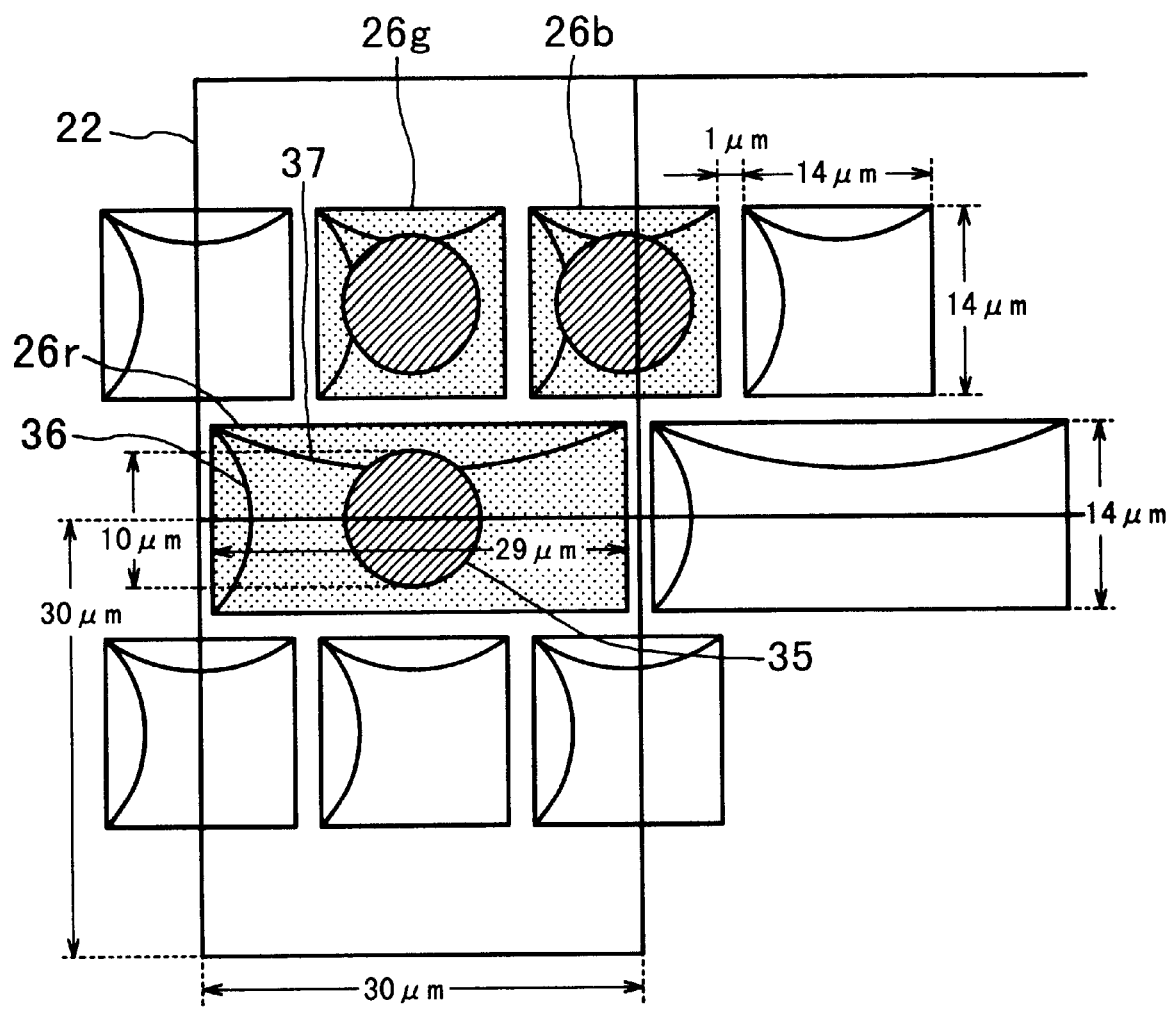
FIG. 13 illustrates a pixel layout in the liquid crystal device in the apparatus of FIGS. 7A–7C.

FIG. 13 is a schematic plan view which corresponds to an enlarged view of a portion of FIG. 12A, showing a pixel layout, i.e., a relative position of a pixel unit including three color pixels, and a microlens. More specifically, FIG. 13 shows positions of reflection electrodes (pixel electrodes) 26g, 26b and 26r for G-, B- and R-pixels, respectively, relative to a microlens 22, and focal (or condensed light) spots 35 formed by the microlens 22 together with disclinations (regions of alignment disorder) 36 and 37. At the time of white display, the disclinations 36 and 37 provide darker regions due to polarization failure attributable to the disorder of liquid crystal molecule tilting directions, thus resulting in a lowering in brightness and color balance disorder leading to a remarkable deterioration of display characteristic. In this embodiment, the R-pixel electrode 26r is set to have an aperture size which is about two times that of the other G- and B-pixel electrodes 26g and 26b. As a result, the disclination 36 does not overlap with a focal spot 35 given by the microlens 22 in the R-pixel, thus providing a good display characteristic. More specifically, the left side of the R-pixel 26r is shifted from the left side of the G-pixel 26g to obviate the obstruction with the disclination 36 in the R-pixel 26r. An example set of dimensions of a microlens 22, a focal spot given by the microlens, and pixel sizes are shown in FIG. 13.

In the above example, for attaching great importance to the efficiency of a red pixel 26r, the size of the red pixel 26r is enlarged relative to the other color pixels 26g and 26b so as to obviate an obstruction by a disclination in the red pixel 26r. This is not essential. For example, it is also possible to design apertures of respective color pixels so as to provide an optimum system balance also in consideration of properties of the lamp and optical system. In the above, two of the three colors R, G and B are designed to have identical aperture sizes, but it is also possible to provide different aperture sizes to all the three color pixels.

In the above example, the pixel arrangement pitch is nearly half of the microlens arrangement pitch vertically and laterally, i.e., in each of the x- and z-directions in FIG. 12A. Further, a G-pixel is disposed right below the center of an associated microlens. On the other hand, an R-pixel is disposed between rows of G- and B-pixels and along a boundary between neighboring microlenses 22 in the z-direction, and a B-pixel is disposed between two G-pixels and along a boundary between neighboring microlenses 22 in the x-direction.

Figure 14:
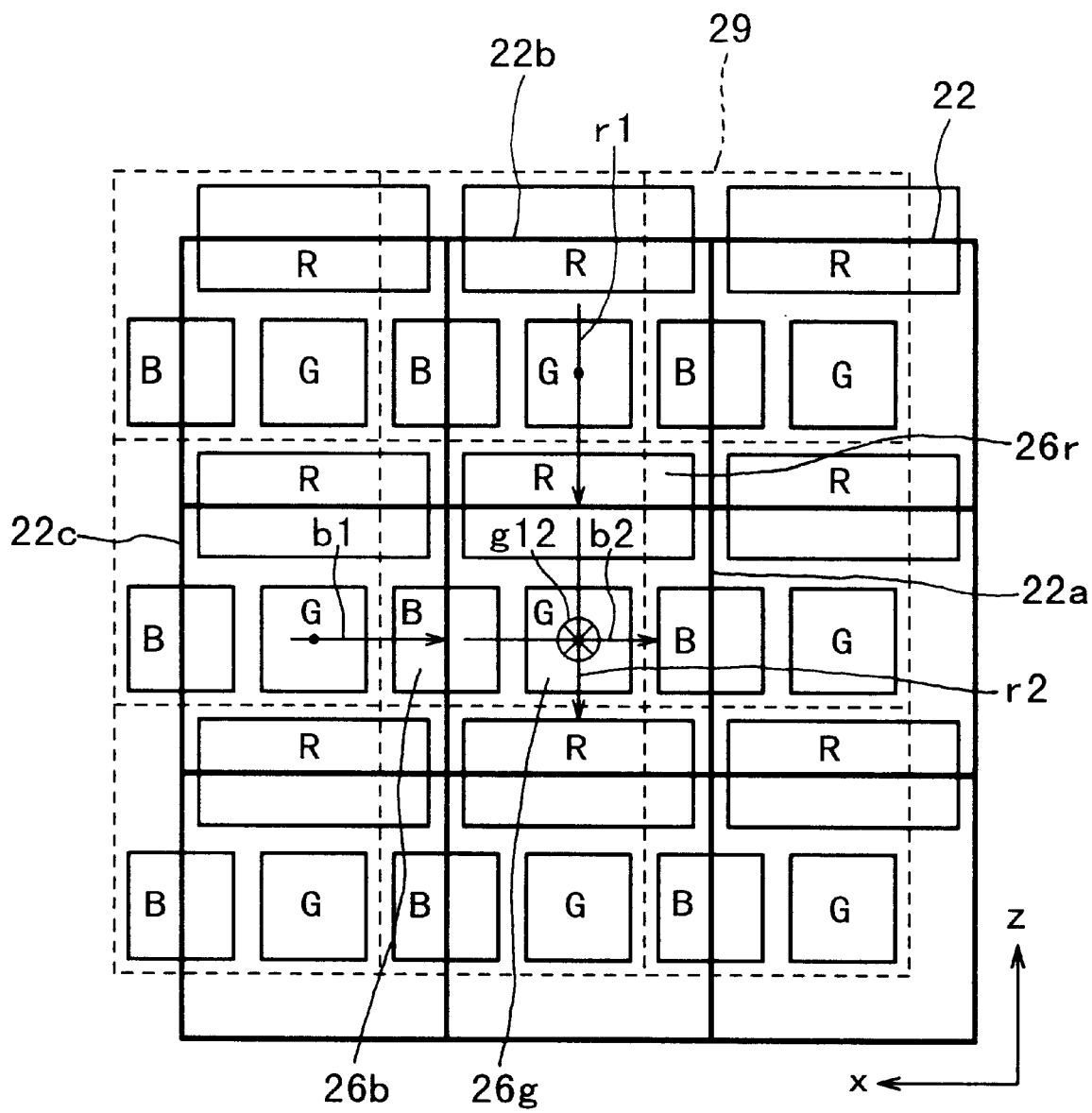
FIG. 14 is an enlarged plan view for illustrating pixels in the liquid crystal device in the apparatus of FIGS. 7A–7C.

FIG. 14 is a partial enlarged plan view of the liquid crystal panel 2 having the pixel arrangement shown in FIG. 12A. Referring to FIG. 14, a square area defined by a dashed line frame 29 represents a pixel unit including a set of R, G and B pixels, which are driven by a matrix drive circuit (27 in FIG. 11) based on R, G and B picture signals for a single pixel position.

Now, one pixel unit including an R-pixel electrode 26r, a G-pixel electrode 26g and a B-pixel electrode 26b is noted. The R-pixel electrode 26r is illuminated with R-light obliquely incident thereto through a microlens 22b as indicated by an arrow r1, and the resultant R-reflected light is emitted through a microlens 22a as indicated by an arrow r2. The B-pixel electrode 26b is illuminated with B-light obliquely incident thereto through a microlens 22c as indicated by an arrow b1, and the resultant Breflected light is emitted through a microlens 22a as indicated by an arrow b2. Further, the G-pixel electrode 26g is illuminated with G-light vertically incident thereto through a microlens 22a as indicated by an arrow g12 directed from the front side to the reverse side of the drawing, and the resultant G-reflected light is emitted through the same microlens 22a vertically in a direction from the reverse side to the front side of the drawing.

Thus, in this embodiment of the liquid crystal panel according to the present invention, the R, G and B pixels constituting one pixel unit are illuminated with light fluxes incident thereto through different microlenses, but the reflected light fluxes are emitted through an identical microlens (22a in this case). This also holds true with the other pixel units each including R, G and B pixels.

Figure 15:
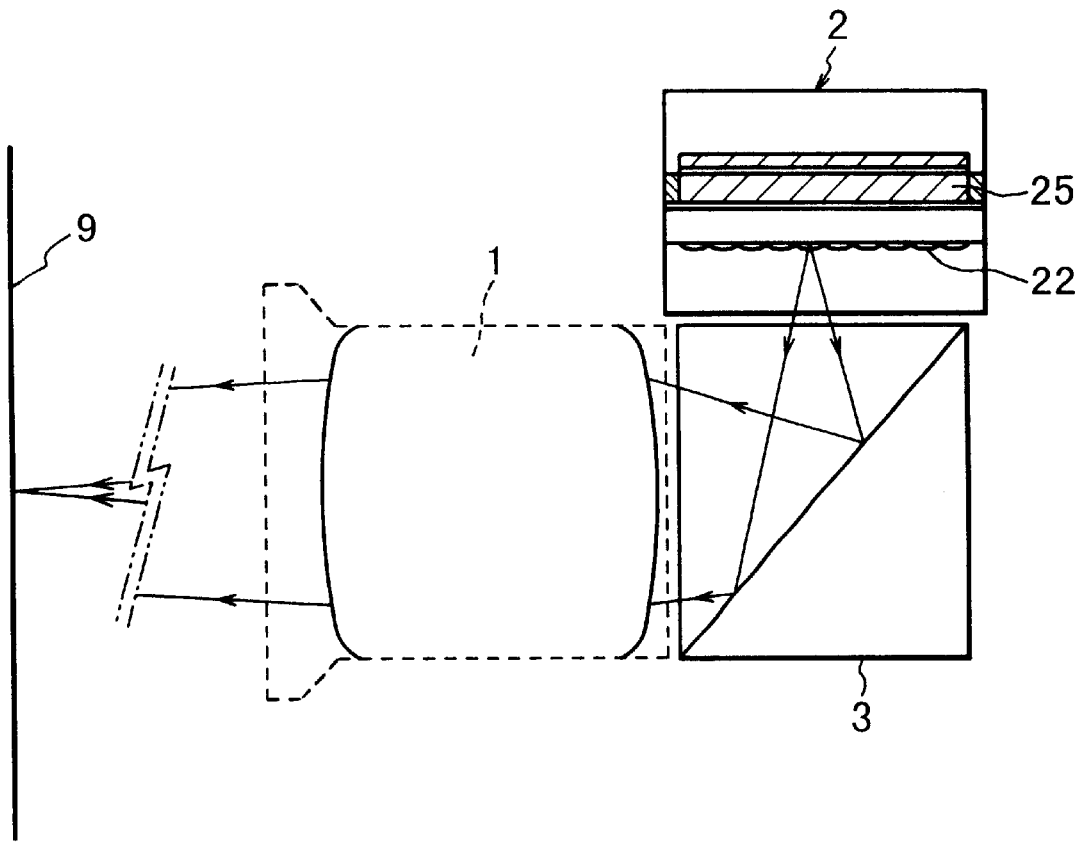
FIG. 15 illustrates an optical system for forming a projection image by projecting emitted light from the liquid crystal panel through a projection lens in the apparatus of FIGS. 7A–7C.
Figure 16:
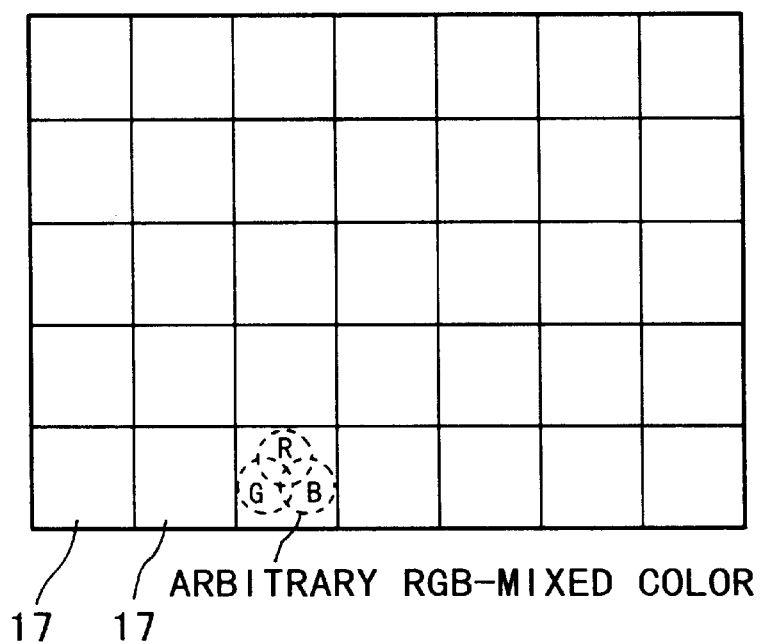
FIG. 16 illustrates a partial enlarged view of the resultant projected picture on the screen.

Accordingly, in a case where all the emitted light fluxes from a liquid crystal panel 2 are passed through a PBS 3 and a projection lens 1 to be projected onto a screen 9 as shown in FIG. 15, if an optical adjustment is effected so that the respective microlenses positions on the liquid crystal panel 2 are projected onto the screen 9, the projected picture is composed of an assembly of frames 17 corresponding to the microlenses as shown in FIG. 16, each frame 17 comprising a color mixture of emitted light fluxes from R, G and B pixels of a corresponding pixel unit. Thus, different from a projected picture retaining an R, G and B-mosaic pattern as shown in FIG. 23 obtained by a conventional system, a high-quality color picture display free from maintenance of such a minute primary color mosaic pattern can be realized.

Figure 17:
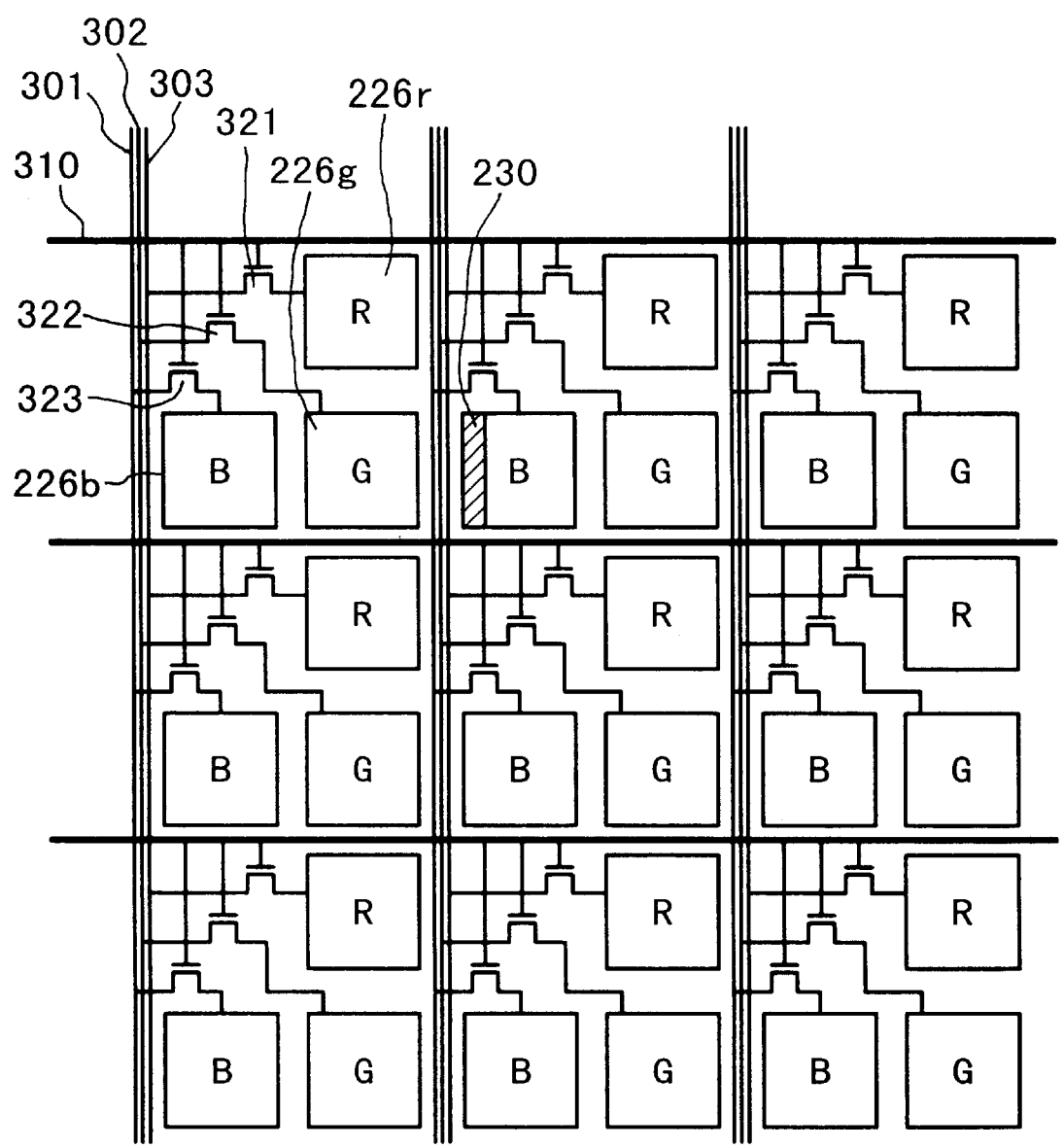
FIG. 17 is a partial circuit diagram of an active matrix drive unit of the liquid crystal device in the apparatus of FIGS. 7A–7C.

Now, the organization of each picture element and the active matrix drive circuit unit 27 formed on the silicon semiconductor substrate 28 used for active drive of the picture elements is described in further detail. FIG. 17 is a schematic circuit diagram illustrating a rough arrangement of relating members of such an active matrix drive circuit while omitting peripheral circuit members such as horizontal and vertical shift registers and related conductor lines. (In FIG. 17, the pixel sizes shown do not accurately reproduce those shown in FIGS. 13 and 14.) Referring to FIG. 17, MOS transistors 321–323 for R-, G- and B-pixels 226r, 226g and 226b, respectively, of a pixel unit are commonly connected to a gate line 310. After the gate line 310 is turned on based on a signal from the vertical shift register, signals from associated sampling switches are passed through signal lines 301–303 to be supplied to the respective pixels 226r, 226g and 226b of R, G and B. Incidentally, such simultaneous writing at R-, G- and B-pixels is not essential, but only writing of specified signals at the respective pixels is required. Various drive methods, such as column inversion, line inversion, dot inversion and field inversion are known, regarding a manner of inversion of positive and negative polarity signals written at respective pixels, and can be adopted as desired. In the case of column inversion, for example, the pixel electrodes for the pixels 226r, 226g and 226b are set to potentials which are positive relative to that of the counter electrode, and the pixel electrodes for pixels 226r, 226g and 226b of a neighboring pixel unit are set to negative potentials relative to the counter electrode. In this case, the disclination is liable to occur remarkably at a hatched portion 230 close to a boundary between the two pixel units. The designing of pixel sizes in view of this effect, for example, and also the organization of a light source and an optical system should be optimized according to the present invention.

Figure 18:
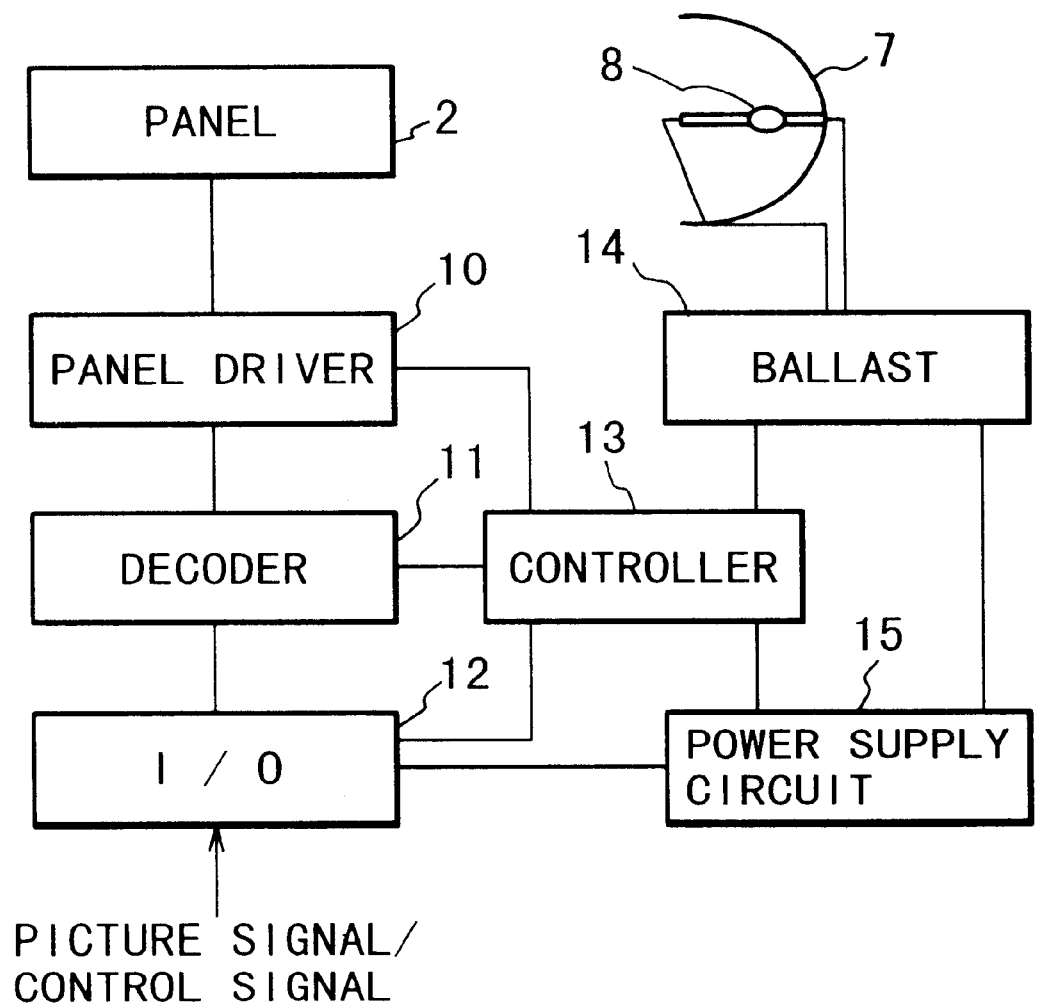
FIG. 18 is a block diagram of a drive circuit system for the apparatus of FIGS. 7A–7C.

FIG. 18 is a block diagram of an entire drive circuit for the projection-type liquid crystal display apparatus. Referring to FIG. 18, the drive circuit includes a panel driver 10 for driving the liquid crystal panel 2 and forming liquid crystal drive signals by subjecting R, G and B picture signals to polarity inversion and prescribed voltage amplification and forming signals for driving the counter electrode 24 and various time signals. An interface 12 is included to decode various picture signals and controlled transmission signals into standard picture signals. A decoder 11 is included to decode the standard picture signals from the interface 12 into R, G and B primary color picture signals and synchronizing signals. A ballast 14 is used to stably drive an arc lamp 8 equipped with a reflector 7 and is connected to a power supply circuit 15 for supplying a power to respective circuits. These units are connected to a controller 7 including an operation unit (not shown) installed therein and effecting overall control of the respective circuit blocks. Thus, the projection-type liquid crystal display apparatus of this embodiment only requires such a very common single device-type projector and still can effect an R, G and B mosaic-free high quality color picture display as described above without requiring a special drive circuit.

According to another embodiment, the liquid crystal panel (liquid crystal device) of the present invention can also assume another color pixel arrangement shown in FIG. 17, wherein each B-pixel is placed right below the center of a microlens, G-pixels are arranged laterally and alternately with the B-pixels, and R-pixels are arranged vertically and alternately with the B-pixels. In this arrangement, B-light is incident vertically, and R- and G-lights are incident obliquely at an identical direction in different directions, so that the reflected light fluxes from the R-, G- and B-pixels are emitted through a common microlens 22, whereby identical effects as in the above embodiment can be attained. It is, of course, possible to adopt an arrangement wherein each R-pixel is disposed directly below the center of a microlens 22, and the other color pixels are arranged alternately with the R-pixels laterally or vertically.

Third Embodiment

Figure 19:
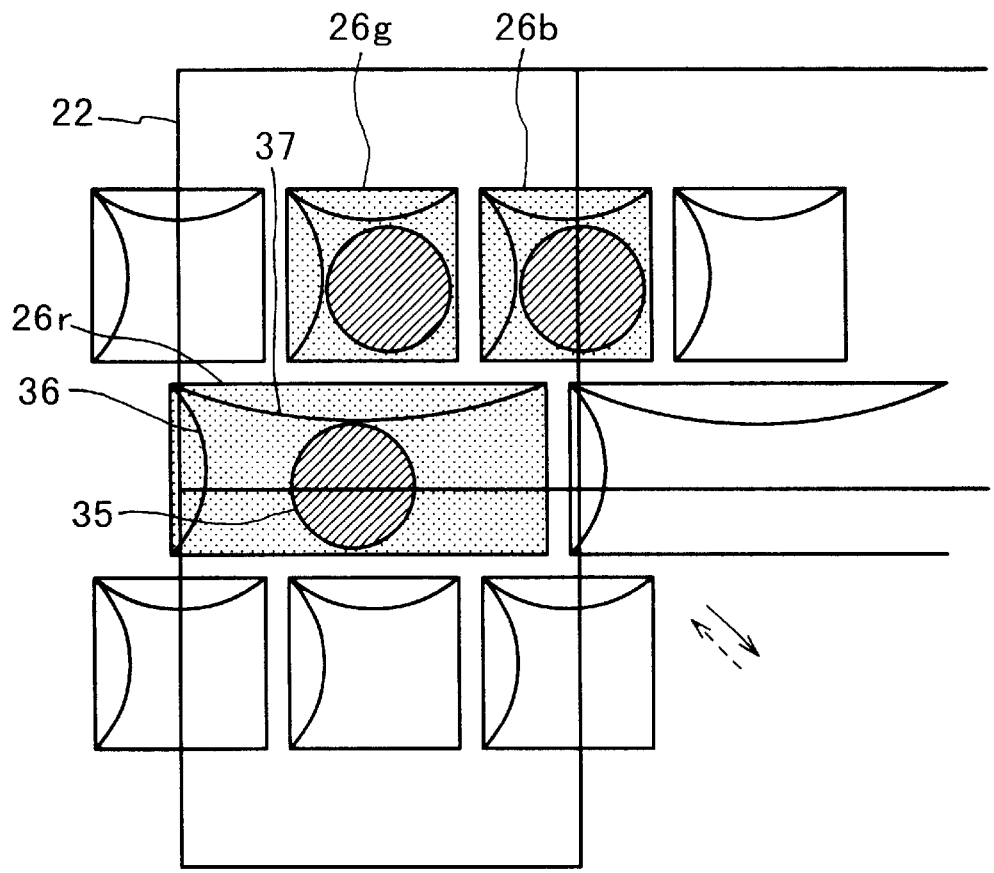
FIG. 19 illustrates a pixel layout in a liquid crystal device according to a third embodiment of the invention.

FIG. 19 illustrates a layout (relative arrangement) of a pixel unit including three color pixels and an associated microlens in a liquid crystal device according to another embodiment of the present invention. The organization of the liquid crystal device is basically identical to that of the above-mentioned liquid crystal device according to the second embodiment, whereas the microlens in this embodiment is disposed to have optical axes which deviate from the centers of associated pixels. In FIGS. 19 and 13, corresponding parts are denoted by identical numerals. The lower and upper substrates have been rubbed obliquely relative to the respective pixels, i.e., in solid-line and dashed-line directions, respectively, whereby disclination regions (i.e., regions of alignment disorder) 36 and 37 exhibiting inferior display quality occur along two sides in the left and above each pixel. In this embodiment, each microlens 22 is disposed to obviate overlapping of focal spots with the disclinations at the associated pixels. More specifically, in this embodiment, the optical axes of each microlens 22 are deviated in a direction (lower right direction in the example of FIG. 19) opposite the sides accompanied with disclinations, and the areal size of a pixel (electrode) 26r is enlarged similarly as in the first embodiment so as to completely obviate the obstruction with the disclination 37 at the pixel 26r. In FIG. 19, the disclinations 36 and 37 and the focal spot 35 are drawn as having clear contours, but actually the changes are gradual so that they can interfere with each other at peripheral portions, thereby causing some degree of picture quality deterioration.

In a specific example of a liquid crystal device having different areas of respective color pixels as described above, the following chromaticity coordinate values of x and y for monochromatic display and white display have been obtained. That is, x=0.15 and y=0.10 for blue color display, x=0.29 and y=0.61 for green color display, x=0.62 and y=0.33 for red color display, and x=0.31 and y=0.31 for white color display. Thus, it is possible to realize desired color balance and high efficiency while retaining chromaticity of respective colors and without enlarging the chip size. Accordingly, as a result of optimum pixel designing in the above-described manner, it is possible to provide a small liquid crystal device and a liquid crystal display apparatus including the liquid crystal device with good color balance.

In the above, there has been raised an example wherein relative to a G-pixel disposed right below (or above) the center of microlens and a B-pixel adjacent thereto, the size of an R-pixel is enlarged by attaching great importance to light utilization efficiency and color balance. This is not essential. For example, it is also possible to design apertures of respective colors so as to provide an optimum system balance with additional consideration on properties of the lamp and optical system. In the above example, two of three colors R, G and B are designed to have identical pixel or aperture sizes, but it is also possible to provide all three color pixels with mutually different pixel sizes. Further, the above example uses a reflection-type panel, but it is also possible to use a panel including a polysilicon or amorphous silicon substrate as described above or a transmission-type panel.

Fourth Embodiment

Figure 20:
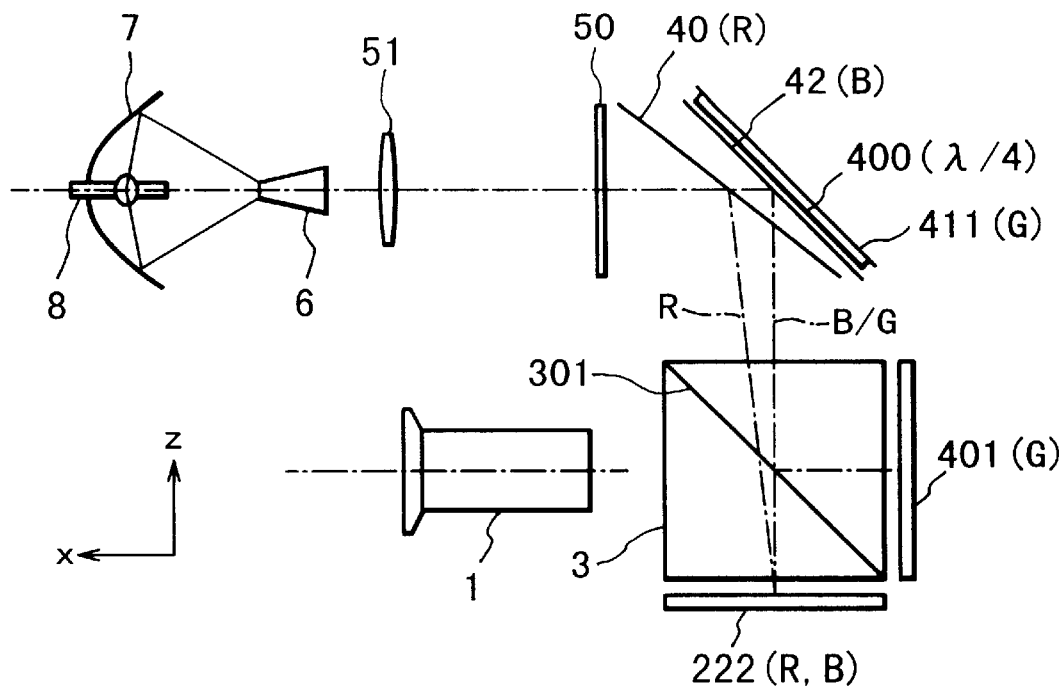
FIG. 20 illustrates an entire optical system for a liquid crystal display apparatus according to a fourth embodiment of the invention.

FIG. 20 illustrates an entire organization of an optical system of a liquid crystal display apparatus according to this embodiment. In FIG. 20, like parts are denoted by like reference numerals as in FIG. 7. Referring to FIG. 20, the liquid crystal display apparatus includes two types of liquid crystal devices, i.e., a microlens-equipped liquid crystal device 222 for R- and B-lights and a liquid crystal device 401 for G-light equipped with no microlens, and also a quarter wave plate 400. The liquid crystal display apparatus further includes an R (red)-light reflection dichroic mirror 40, G (green)-light reflection dichroic mirror 411 and a B (blue)-light reflection dichroic mirror 42 having spectral reflection characteristics similar to those shown in FIGS. 8C, 8B and 8A, respectively. These dichroic mirrors are disposed so as to color separate white illumination light into RGB-primary color lights and illuminate the liquid crystal panels 222 and 401 with such primary color lights as will be described later.

Now, the process of light flux progress will be described. First, white light flux emitted from a light source 8 is condensed by an elliptical reflector 7 at an entrance of an integrator 6 disposed in front of the elliptical reflector 7 and caused to proceed through the longitudinal body of the integrator 6 while causing repetitive reflection within the body for uniformizing the spatial intensity distribution thereof. Then, the light flux emitted from the integrator 6 is passed through a convex lens 51 and a Fresnel lens 50 to be converted into parallel light flux in a negative (−) direction along the x-axis and reach the R-reflection dichroic mirror 40.

At the R-reflection dichroic mirror 40, only the R (red)-light fraction is reflected and directed with a prescribed angle toward a polarization beam splitter (PBS) 3. On the other hand, B- and G-light fractions are passed through the R-reflection dichroic mirror 40 and directed toward the B-reflection dichroic mirror 42 which is disposed with an angle of 45 degrees with respect to the PBS 3. Of these fractions, the B-light fraction is reflected by the B-reflection dichroic mirror 42 and directed toward the PBS 3. The G-light fraction is passed also through the B-reflection dichroic mirror 42 to reach the quarter wave plate 400, where the polarization of the B-light is modulated. The modulated B-light is then reflected by the G-reflection dichroic mirror 411, again subjected to polarization modulation by the quarter wave plate 400 and then directed toward the PBS 3. As a result, only the G-light is provided with a polarization phase shift by λ/2 with respect to the R- and B-lights.

R- and B-lights entering the PBS 3 are subjected to reflection and polarization modulation by the microlens-equipped liquid crystal device 222 and returned to the PBS 3 to be projected through the projection based on the same principle as explained in the second embodiment. On the other hand, G-light entering the PBS 3 is reflected perpendicular at a plane 301 in the PBS 3 and directed toward the liquid crystal device 401. The G-light is then subjected to reflection and polarization modulation by the liquid crystal device 401 and projected through the projection lens 1. Thus, as G-light has a phase shifted by λ/2 from that of R- and B-lights, G-light receives a different reflection function at the plane 301 of the PBS 3, i.e., reflected at first incidence and, after polarization modulation by the panel 401, transmitted, by the plane 301, to be directed to the projection lens 1.

Figure 21:
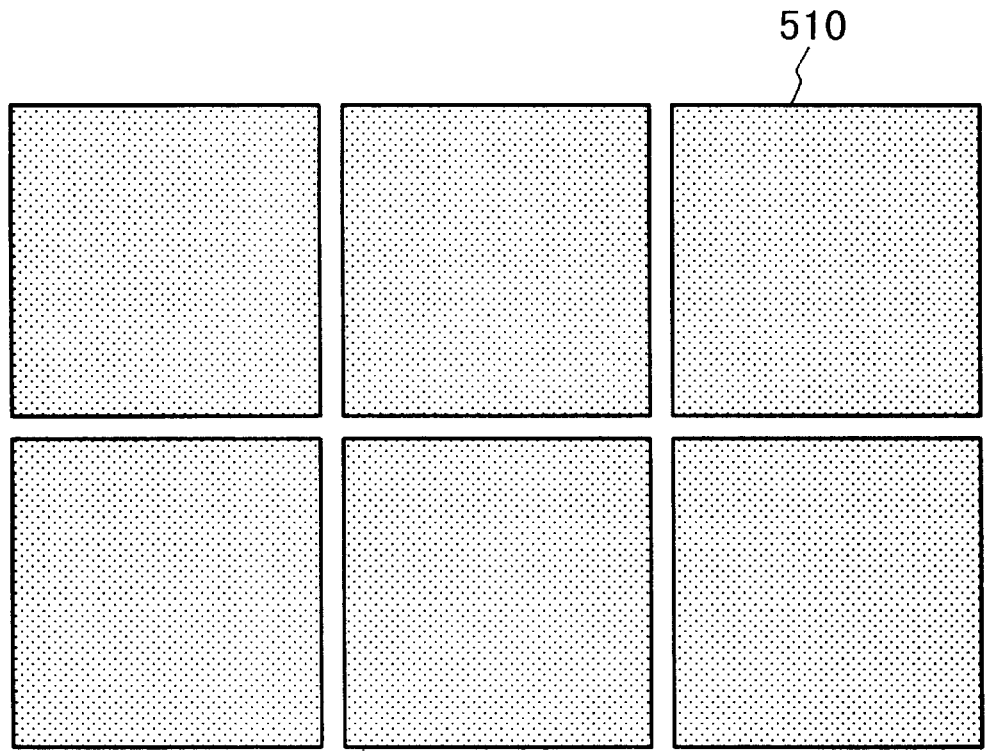
FIGS. 21 and 22 respectively illustrate a pixel layout in a liquid crystal device in the apparatus of FIG. 20.
Figure 22:
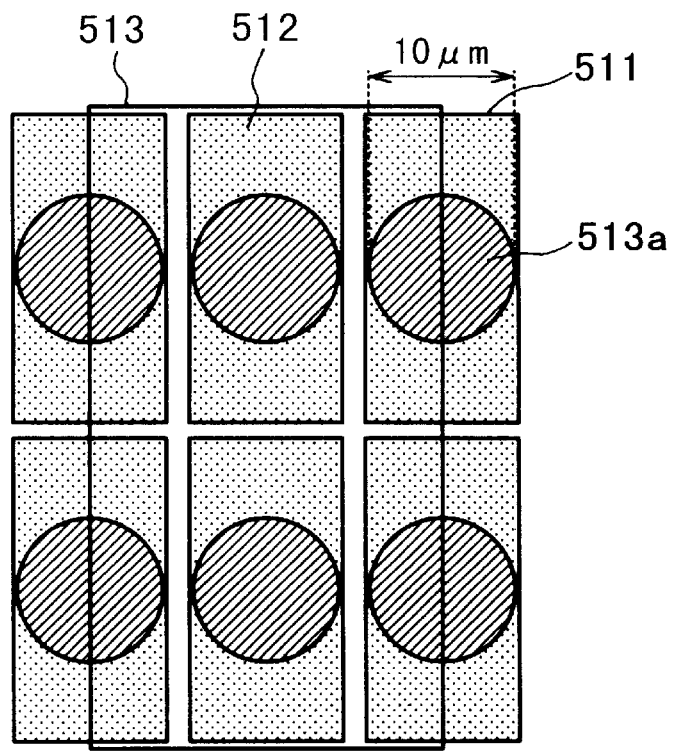

The organization of the liquid crystal devices is supplemented. FIG. 21 shows a reflection electrode arrangement in the liquid crystal device 401 for G-light including 23 μm-square reflection electrodes 510 having flat surfaces. The liquid crystal device 401 includes no microlenses. FIG. 22 shows a reflection electrode arrangement together with focal spots in the liquid crystal device 222 for R- and B-lights. The liquid crystal device 222 includes reflection electrodes 511 for R-light and 512 for B-light disposed alternately and each having sizes of 23 μm×11 μm. Microlenses 513 are arranged at a pitch of 24 μm so as to provide focal spots each measuring ca. 10 μm in diameter. The microlenses 513 may have a rectangular or square shape as shown in FIG. 22, but can be composed of ordinary cylindrical lenses. In a specific example, a homeotropically aligned nematic liquid crystal material ("MLC 6608", available from Merck Co.) as used in the first embodiment may be used together with alignment film materials and rubbing conditions similar to those adopted in first embodiment in both liquid crystal devices 222 and 401.

According to this embodiment, it is possible to realize a liquid crystal display apparatus having a high aperture ratio to provide a bright display with good color balance. Thus, the liquid crystal display apparatus of this embodiment includes two types of liquid crystal devices providing R, G and B pixels including pixels of at least one color having a different size from the other to attain the above effects, thus realizing an increased design latitude. In the above example, the pixels for G-light are enlarged in size relative to the pixels for R- and B-lights. This is not essential. For example, it is also possible to design apertures of respective colors so as to provide an optimum system balance with additional consideration on properties of the lamp and optical system. In the above example, two of three colors R, G and B are designed to have identical aperture sizes, but it is also possible to provide all three color pixels with mutually different aperture sizes. Further, the above example uses a transmission-type panel including a TFT-substrate, but it is also possible to use a reflection-type panel.

As described above, according to the present invention, pixels of plural colors are designed so that pixels of at least one color have an effective pixel area (defined by the shape and size of pixel electrodes and apertures thereof) different from those of the other colors, whereby it becomes possible to provide a small size liquid crystal device capable of exhibiting good color balance and light utilization efficiency and a liquid crystal display apparatus including such a liquid crystal device.

What is claimed is:

1. A liquid crystal device, comprising: a layer of liquid crystal, two-dimensionally arranged pixel electrodes disposed so as to apply voltages to the liquid crystal and, together with the liquid crystal, form two-dimensionally arranged pixels each corresponding to one pixel electrode and designed to emit light of one of plural colors, and an array of microlenses disposed to illuminate each pixel with a condensed light spot of illumination light of one of said plural colors, wherein pixels of at least one of said plural colors are set to have a pixel size different from those of pixels of the other colors(s).

2. A liquid crystal device according to claim 1, wherein said plural colors are three primary colors, the pixels for the three primary colors are arranged two-dimensionally in a first direction and a second direction, so that pixels for two of the three primary colors are arranged alternately at a first pitch in the first direction, and pixels for different two of the three primary colors are arranged alternately at a second pitch in the second direction, and the microlenses are arranged two-dimensionally at a pitch twice the first pitch in the first direction and at a pitch twice the second pitch in the second direction.

3. A liquid crystal device according to claim 1, wherein each microlens is disposed to have an optical axis for forming the condensed light spot, which optical axis is shifted from the center of an associated pixel.

4. A liquid crystal device according to claim 1, wherein the pixel electrodes function to reflect the illumination light.

5. A liquid crystal display apparatus, including: a liquid crystal device according to any one of claims 1–4, an illumination means for illuminating the liquid crystal device with illumination light of the plural colors so that modulated illumination light of the plural colors is emitted from the liquid crystal device, and a projection means for receiving the modulated illumination light emitted from the liquid crystal device to project picture light.

6. A liquid crystal display apparatus, including: a plurality of liquid crystal devices each comprising a layer of liquid crystal, and two-dimensionally arranged pixel electrodes disposed so as to apply voltages to the liquid crystal and, together with the liquid crystal, form two-dimensionally arranged pixels each corresponding to one pixel electrode and designed to emit light of one of one or plural colors; an illumination means for illuminating the plurality of liquid crystal devices with illumination light of corresponding color(s) so that modulated illumination light of the corresponding color(s) is emitted from each liquid crystal device; an optical synthesis means for synthesizing the modulated illumination light emitted from the plurality of liquid crystal devices; and a projection means for receiving the synthesized modulated illumination light to project picture light; wherein pixels of at least one among a total of said one or plural colors of the plurality of liquid crystal devices are set to have a pixel size different from those of pixels of the other color(s).

\* \* \* \* \*

UNITED STATES PATENT AND TRADEMARK OFFICE
CERTIFICATE OF CORRECTION

PATENT NO.    : 6,466,285 B1                                        Page 1 of 1
DATED         : October 15, 2002
INVENTOR(S)   : Takeshi Ichikawa It is certified that error appears in the above-identified patent and that said Letters Patent is hereby corrected as shown below:

<u>Drawings,</u>
Sheet 5, Fig. 6, "COMPPUTER" (both occurrences) should read -- COMPUTER --.

<u>Column 1,</u>
Line 60, "polarized-light" should read - polarized light --.

<u>Column 7,</u>
Line 18, "Rand" should read -- R- and --.

<u>Column 8,</u>
Line 22, "(TFTS) 1236" should read -- (TFTs) 1236 --; and
Line 66, "sound board 390" should read -- sound board --.

<u>Column 11,</u>
Line 44, "respectively" should read -- respectively, --.

<u>Column 13,</u>
Line 10, "destination" should read -- disclination --; and
Line 12, "2." should read -- 22. --.

<u>Column 15,</u>
Line 67, "Breflected" should read -- B-reflected --.

<u>Column 20,</u>
Line 4, "small size" should read -- small-size --.

Signed and Sealed this

First Day of July, 2003

JAMES E. ROGAN
*Director of the United States Patent and Trademark Office*